United States Patent
Chiu et al.

(10) Patent No.: US 11,397,417 B2
(45) Date of Patent: Jul. 26, 2022

(54) HYBRID WIDE FIELD OF VIEW TARGET SYSTEM

(71) Applicant: Automation Engineering, Inc., Tewksbury, MA (US)

(72) Inventors: Michael Chiu, Somerville, MA (US); Regan Mills, Stoneham, MA (US); Lu Ren, Reading, MA (US)

(73) Assignee: Automation Engineering Inc., Tewksbury, MA (US)

( * ) Notice: Subject to any disclaimer, the term of this patent is extended or adjusted under 35 U.S.C. 154(b) by 481 days.

(21) Appl. No.: 16/693,241

(22) Filed: Nov. 23, 2019

(65) Prior Publication Data
US 2021/0157295 A1    May 27, 2021

(51) Int. Cl.
| | |
|---|---|
| *G05B 19/401* | (2006.01) |
| *G06T 7/80* | (2017.01) |
| *B25J 9/16* | (2006.01) |
| *G02B 27/62* | (2006.01) |
| *G06T 7/73* | (2017.01) |

(52) U.S. Cl.
CPC .......... *G05B 19/401* (2013.01); *B25J 9/1697* (2013.01); *G02B 27/62* (2013.01); *G06T 7/73* (2017.01); *G06T 7/80* (2017.01); *G05B 2219/37618* (2013.01)

(58) Field of Classification Search
CPC ...................... G02B 27/62; G05B 2219/37618
See application file for complete search history.

(56) References Cited

U.S. PATENT DOCUMENTS

| | | |
|---|---|---|
| 8,422,005 B2 | 4/2013 | Borchard et al. |
| 9,766,473 B1 | 9/2017 | Tamasanis et al. |
| 2005/0212951 A1* | 9/2005 | Miyata ............... G02B 7/04 348/E5.045 |

(Continued)

FOREIGN PATENT DOCUMENTS

EP    3 076 148 B1    10/2016

OTHER PUBLICATIONS https://trioptics.com/products/procam-camera-modules-active-alignment-and-testing, Dec. 18, 2018, 12 pages.

(Continued)

*Primary Examiner* — Jayanti K Patel
*Assistant Examiner* — Christopher Kingsbury Glover
(74) *Attorney, Agent, or Firm* — George Jakobsche Patent Counsel PLLC

(57) ABSTRACT

A robotic system automatically aligns, and/or tests alignment of, a lens to a digital camera or other workpiece. The system includes an optical target, an intermediate lens and a plurality of collimators peripheral to the intermediate lens to accommodate a wide range of fields of view of the workpieces, without requiring changes in equipment hardware. When manufacturing or testing a workpiece with a relatively narrow field of view, the entire field of view of the workpiece can be filled with a view of the target through the intermediate lens, and the collimators need not be used. However, when manufacturing or testing a camera having a relatively large field of view, the intermediate lens is used to fill a central portion of the field of view with an image of the target, and the collimators are used to fill a remaining portion of the field of view with images of reticles.

23 Claims, 15 Drawing Sheets

(56) References Cited

U.S. PATENT DOCUMENTS

2017/0201744 A1* 7/2017 Wong .................. H04N 5/2354
2018/0238769 A1 8/2018 Ikawa et al.

OTHER PUBLICATIONS http://www.nextas.com/products/aa/index.html, Jan. 6, 2020, 7 pages.
http://www.imatest.com/products/equipment-active-align-im-sa04f6, Sep. 2, 2018, 3 pages.
https://www.photonics.com/Article.aspx?AID=57163, Feb. 4, 2015, 10 pages.
https://www.continental-automotive.com/en-gl/Passenger-Cars/Chassis-Safety/Avanced-Driver-Assistance-Systems/Cameras/Surround-View-Camera, date unknown, 2 pages.
Hanshin Lee et al., "Analysis of active alignment control of the Hobby-Eberly Telescope Wide Field Corrector using Shack-Hartmann wavefront sensors," Proc. of SPIE, vol. 7738 77380I-1, 2010, 14 pages.
International Searching Authority/EP, International Search Report and Written Opinion of the International Searching Authority, Application No. PCT/US2020/049201, dated Jan. 15, 2021, 13 pages.

* cited by examiner

HYBRID WIDE FIELD OF VIEW TARGET SYSTEM

BACKGROUND

Technical Field

The present invention relates to automatic robotic alignment of optical components during manufacture or testing and, more particularly, to apparatus and methods for manufacturing and/or testing optical components, such as cameras or other workpieces, having wide fields of view, wide ranges of fields of view or ranges of workpieces, each having a different size field of view.

Related Art

Robots are used in many precision manufacturing and/or testing processes. For example, robots are used to precisely align lenses before digital camera sensors, such as in the manufacture or testing of cellular telephones and cameras for automobiles. In other examples, robots align ends of optical fibers before lasers or light sensors in the manufacture of telecommunication and computer network equipment. Many of the lenses are quite small, on the order of several millimeters in diameter, and must, therefore, be positioned with high precision, often on the order of about ±5 µm or less, relative to the sensors or lasers.

To keep costs down, less-than-precise methods are often used to manufacture optical elements for the lenses and to mount the optical elements in lens housings. Consequently, the optical elements and lenses are often not uniform, from piece to piece. That is, dimensions and symmetries of the components often vary from lens to lens or other optical components, resulting in variations in focal length and orientation of the optical axes of the components.

To compensate for such variations, several known methods are used to custom align each lens to its corresponding sensor. One method, developed by Automation Engineering, Inc. ("AEi"), Wilmington, Mass., involves using a robot to attach a lens barrel to an image sensor or its substrate, or to a camera housing that includes the image sensor, by an adhesive. The position of the lens barrel, relative to the image sensor, is adjusted in free space by the robot, while image data generated by the image sensor is analyzed by a processor. The processor commands the robot to position the lens barrel for best optical performance of the lens. This method is referred to as "active alignment." The robot then holds the lens barrel in position until the adhesive cures sufficiently to prevent objectionable creep once the robot releases the lens barrel.

Using this method, the position of the lens may be adjusted along all three linear axes (x, y and z), and pitch (rotation about the x axis) and roll (rotation about the y axis) of the lens may be adjusted, to achieve a lens position and orientation, relative to the sensor, that compensates for some, most or all imperfections in the optical elements and in the way the optical elements are mounted within the barrel with respect to the position of the image sensor. This method is referred to as aligning about five degrees of freedom.

A refinement of this method, also develop by Automation Engineering, Inc., involves the robot also rotating the lens about the optical axis of the lens or about the z axis to optimize image quality, to compensate for angular lens asymmetries in this axis. Adding this refinement to the 5-degree of freedom alignment method provides a 6-degree of freedom alignment. In other cases, this 6-degree of freedom alignment is performed for sensor alignment, i.e., the lens position is fixed, while the robot holds and positions the sensor to perform the alignment.

Thus, active alignment involves measuring one or more key optical performance attributes of a combination of components during manufacture or testing and using the measured attributes in a feedback loop to control the manufacture or provide test results. For example, a visual target, such as a test pattern, may be disposed within a viewing angle (field of view) of a lens-and-image-sensor combination while a robot steps or continuously moves (collectively "scans") the lens through a series of positions (ex., along the x, y and z axes) and orientations (ex., tips, tilts and rotations about the z axis). A processor analyzes image data from the sensor at each position and/or orientation and, based on this analysis, the processor controls the robot to position and orient the lens for optimum image quality. The lens is then fixed in position, relative to the sensor, or vice versa, such as by an adhesive. Active alignment is, therefore, able to compensate for piece to piece variations in components.

Similarly, active testing involves a robot scanning a lens, camera or other unit under test (workpiece) through a series of positions and orientations, while a processor analyzes image data from the sensor at each position and/or orientation and, based on this analysis, the processor quantifies the image quality of the unit under test. Such tests may be used for quality control, such as to accept or reject previously manufactured units.

As noted, active alignment or active testing involves a suitable target. The target should fill the field of view of the unit under test. Otherwise, portions of the field of view of the unit under test would not be tested. Similarly, target features should be appropriately sized and positioned to provide meaningful test results.

However, some workpieces, such as front-view automotive cameras, are used for several tasks, such as collision avoidance, sign reading, lane keeping and pedestrian tracking. When building or testing such a camera, the test should include several different fields of view, for example: (a) an on-axis (0 degrees) at 100 m (meters) field of view for down-road collision avoidance, (b) a 10 degrees field of view for sign reading, (c) a 20 degrees field of view for lane keeping and (d) a 40 degrees field of view for pedestrian tracking. It would be desirable to build or test a workpiece at several different fields of view and/or at several different focal distances on the same equipment, without requiring changes in equipment hardware.

In some cases, equipment is used to manufacture or test multiple types of workpieces, each type of workpiece having a different field of view. For example, a narrow, such as a 10 degree, field of view camera may be manufactured or tested during a morning shift, and a surround-view, such as a 180 degree, camera may be manufactured or tested in an afternoon shift on the same equipment. It would be desirable to be able to build or test both cameras on the same equipment, without requiring changes in equipment hardware. However, no single target may be appropriate for all the camera types. Similarly, each camera type may require the target to be located a different optical distance from the unit under test.

Current robotic manufacturing or testing equipment requires labor-intensive reconfiguration to handle workpieces having a wide range of fields of view and/or a wide range of optical distances.

SUMMARY OF EMBODIMENTS

An embodiment of the present invention provides a system for automatically aligning, and/or testing alignment of, a workpiece. The workpiece has a workpiece optical axis. During a first time period, the workpiece includes a first lens and a first image sensor collectively having a first field of view. During a second time period, the workpiece includes a second lens and a second image sensor collectively having a second field of view. The second field of view is wider than the first field of view.

The system includes a processor, a target and an intermediate lens. The target is configured to translate substantially along the respective workpiece optical axis, in response to a first command from the processor, to a position specified by the processor. The processor is configured to thereby selectively adjust optical spacing between the target and the workpiece.

The intermediate lens is disposed optically between the target and the workpiece. The intermediate lens is configured to form, during the first time period, a first image of the target on the first image sensor, via a sequence of the intermediate lens and the first lens. The first image fills a first fraction of the first image sensor.

The intermediate lens is configured to form, during the second time period, a second image of the target on a central portion of the second image sensor, via a sequence of the intermediate lens and the second lens. The second image fills a second fraction of the second image sensor smaller than the first fraction.

The system also includes a plurality of collimators. The plurality of collimators is disposed peripheral to the intermediate lens. Each collimator has a respective reticle. Each collimator is configured to project, during the second time period, a respective image of the reticle, through the second lens, on the second image sensor, without the image of the reticle passing through the intermediate lens. The image of the reticle extends outside an outer boundary of the second image of the target on the second image sensor.

The system also includes a robot. The robot is configured to grasp and, in response to a second command from the processor, scan at least a portion of the workpiece along a trajectory.

The processor is configured to analyze signals acquired from the workpiece while the workpiece is scanned along the trajectory and thereby quantitatively assess a degree of optical alignment of the workpiece.

Optionally, in any embodiment, focal length of each collimator of the plurality of collimators may be adjustable. Each collimator may be configured to adjust its focal length in response to a third command from the processor.

Optionally, in any embodiment, the plurality of collimators may include at least four collimators.

Optionally, in any embodiment, the plurality of collimators may be immobile, relative to the intermediate lens, along the workpiece optical axis.

Optionally, in any embodiment, the first field of view may be less than about 60°.

Optionally, in any embodiment, the second field of view may be greater than about 60°.

Optionally, in any embodiment, each collimator of the plurality of collimators may be oriented toward an entrance pupil center of the workpiece. Location of the entrance pupil center may be based at least in part on a field of view of interest.

Optionally, any embodiment may also include, for each collimator, a respective folding optical element. The folding optical element may be configured to redirect the respective image of the reticle toward an entrance pupil center of the workpiece. Location of the entrance pupil center may be based at least in part on a field of view of interest.

Optionally, in any embodiment, an angle of each respective folding optical element may be adjustable.

Optionally, in any embodiment, an optical axis of each collimator of the plurality of collimators may be oriented parallel to the workpiece optical axis.

Optionally, in any embodiment, an optical axis of each collimator of the plurality of collimators may be adjustable, relative to the workpiece optical axis.

Optionally, in any embodiment, the plurality of collimators may be attached via a kinematic mount.

Optionally, any embodiment may also include an optical stage configured to releasably receive the plurality of collimators. Number and/or disposition of collimators in the plurality of collimators may be adjustable.

Optionally, in any embodiment, each collimator of the plurality of collimators may be individually removable.

Optionally, in any embodiment, at least some of the respective reticles of the plurality of collimators may be different from other of the respective reticles of the plurality of reticles.

Optionally, in any embodiment, at least some collimators of the plurality of collimators may be configured to project respective images of the respective reticles with different wavelengths of light from other of the collimators of the plurality of collimators.

Optionally, in any embodiment, wavelength of light from the plurality of collimators may be adjustable.

Optionally, in any embodiment, color and/or intensity of the images of the respective reticles may be adjustable.

Optionally, in any embodiment, at least some collimators of the plurality of collimators may be configured to project respective images of the respective reticles at different angles, relative to the workpiece optical axis, from other of the collimators of the plurality of collimators.

Optionally, in any embodiment, the plurality of collimators may be configured to translate along the respective workpiece optical axis, in response to a fourth command from the processor, to a position specified by the processor. The processor may be configured to thereby selectively adjust optical spacing between the plurality of collimators and the workpiece in coordination with the optical spacing between the target and the workpiece.

Optionally, in any embodiment, the plurality of collimators may be immobile, relative to the intermediate lens, along the workpiece optical axis.

Optionally, in any embodiment, the plurality of collimators may be mobile, relative to the intermediate lens, along the workpiece optical axis.

Optionally, in any embodiment, the processor may be configured to automatically control projection by the plurality of collimators of the respective images of the respective reticles, based at least in part on magnitude of the field of view of a current workpiece.

Another embodiment of the present invention provides a non-transitory computer-readable medium. The Medium is encoded with instructions. When executed by a processor, the instructions establish processes for performing a computer-implemented method of automatically aligning, and/or testing alignment of, a workpiece. The workpiece has a workpiece optical axis. During a first time period, the workpiece includes a first lens and a first image sensor collectively having a first field of view. During a second time period, the workpiece comprises a second lens and a second image sensor collectively having a second field of view wider than the first field of view.

The processes include a process configured to translate a target substantially along the respective workpiece optical axis, in response to a first command from the processor, to a position specified by the processor. The processor is configured to thereby selectively adjust optical spacing between the target and the workpiece. The processor is configured, during the first time period, to cause formation of a first image of the target on the first image sensor, via a sequence of an intermediate lens, disposed optically between the target and the workpiece, and the first lens. The first image fills a first fraction of the first image sensor. The processor is configured, during the second time period, to cause formation of a second image of the target on a central portion of the second image sensor, via a sequence of the intermediate lens and the second lens. The second image fills a fraction of the second image sensor smaller than the first fraction.

The processes also include a process configured to control a plurality of collimators. The plurality of collimators is disposed peripheral to the intermediate lens. Each collimator has a respective reticle. Each collimator is configured to project, during the second time period, a respective image of the reticle, through the second lens, on the second image sensor, without the image of the reticle passing through the intermediate lens. The image of the reticle extends outside an outer boundary of the second image of the target on the second image sensor.

The processes also include a process configured to control a robot. The robot is configured to grasp and, in response to a second command from the processor, scan at least a portion of the workpiece along a trajectory.

The processes also include a process configured to analyze signals acquired from the workpiece while the workpiece is scanned along the trajectory and thereby quantitatively assess a degree of optical alignment of the workpiece.

Optionally, the plurality of collimators may be immobile, relative to the intermediate lens, along the workpiece optical axis.

BRIEF DESCRIPTION OF THE DRAWINGS

The invention will be more fully understood by referring to the following Detailed Description of Specific Embodiments in conjunction with the Drawings, of which.

DETAILED DESCRIPTION OF SPECIFIC EMBODIMENTS

Embodiments of the present invention provide robotic systems for automatically aligning and/or testing alignment of a lens to a digital camera or other workpiece. These embodiments facilitate automatic alignment and/or testing of a wide range of fields of view, without requiring changes in equipment hardware.

Figure 4:
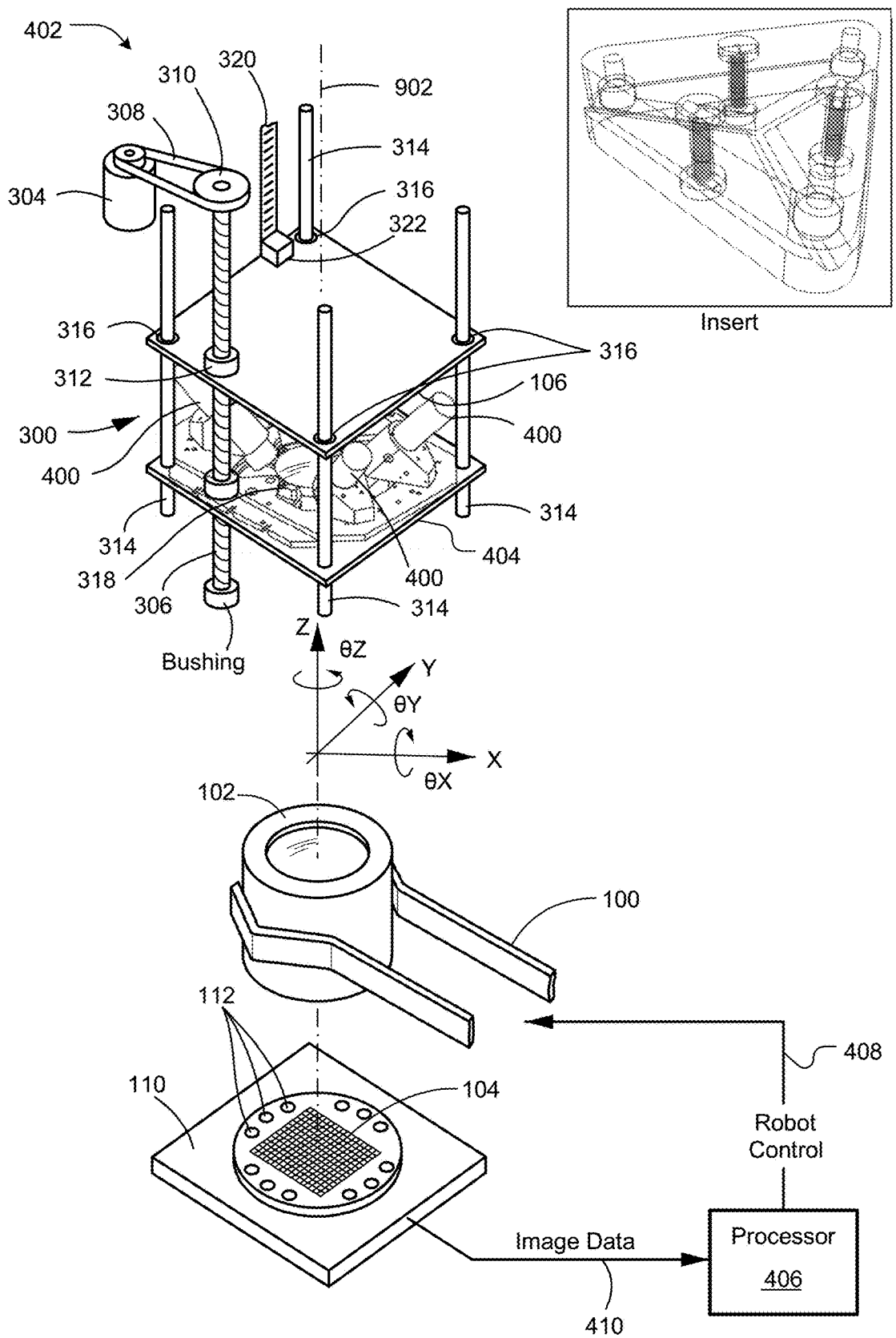
FIG. 4 is a perspective illustration of a robotic active alignment/test system, according to an embodiment of the present invention.

As shown in FIG. 4, each embodiment includes a combination of an intermediate lens 318 and a plurality of collimators 400. As used herein, the term "lens" includes single-element lenses and multi-element lenses. When manufacturing or testing a camera with a relatively narrow field of view, such as less than about 30°, the entire field of view of the camera can be filled with a view of the target 106 through the intermediate lens 318, and the collimators 400 need not be used to reach any given point in the workpiece field of view. However, when manufacturing or testing a camera having a relatively large field of view, both the intermediate lens 318 and the plurality of collimators 400 can be used to fill, or at least project into important portions of, the camera's field of view.

On any camera, it is valuable to be able to make measurements at multiple locations within an entire field of view because, in general, a wider field of view provides more measurement points and, in general, more measurement points provide better alignment than fewer measurement points. On any camera, it is valuable to be able to make measurements at different object distances. Thus, an ideal targeting system would allow high capacity, flexibility and accuracy.

Embodiments described herein can simulate real-world environments for assembling and/or testing cameras or other optical workpieces. For example, these embodiments fulfill a need to accurately generate scenes with large and variable object distances over wide fields of view.

Active Alignment

As described in U.S. Pat. No. 9,766,473, the entire contents of which are hereby incorporated by reference herein for all purposes, during an active alignment/test scan, an active alignment/testing system collects position information about a scanned optical element, such as a lens, and then estimates a relationship between position of the scanned optical element and quality of alignment of the optical element. From this alignment quality versus location data, an optimum alignment position can be automatically determined, and the scanned optical element can then be automatically positioned at the determined optimum alignment position and then fixed in place, or a quantitative assessment of the alignment can be automatically provided.

Figure 1:
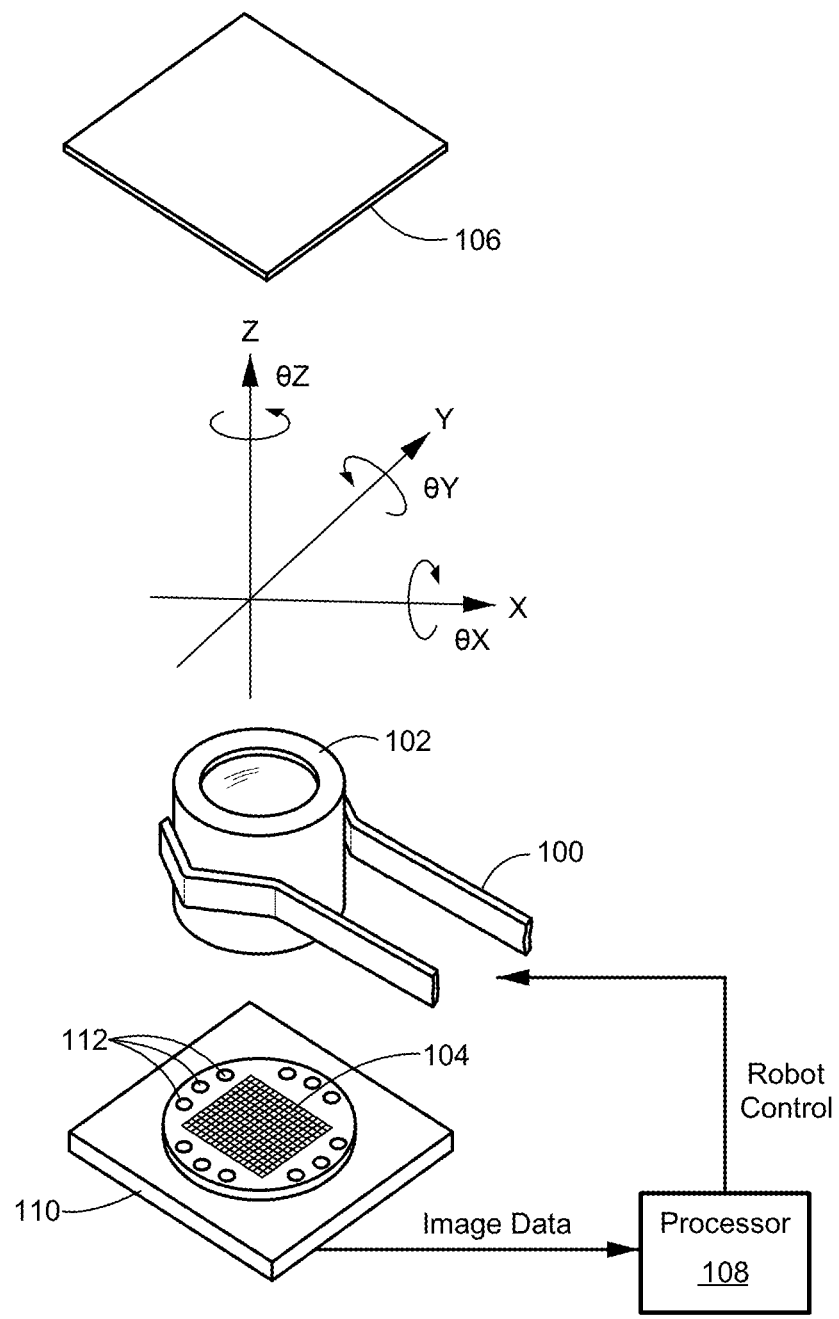
FIG. 1 is a perspective illustration of a robotic active alignment system, according to the prior art.

As alluded to above, an established approach to align objects during assembly or test operations involves use of active feedback or measurements that correlate directly to a degree (quality) of alignment between the optical elements. For example, as illustrated in FIG. 1, an automated robot (represented by a gripper 100) is used to optimally align a lens 102 before a pixelated digital camera sensor 104 during assembly of the two objects 102 and 104 by evaluating focus sharpness of images taken by the sensor 104 while it is powered up and pointed towards an alignment target 106, while positioning the lens 102 at successive locations along the x, y and z axes and successive orientations about the x, y and z axes, with respect to the sensor 104. Pitch (about the x axis), roll (about the y axis) and yaw rotation about the z axis (the optical axis) are indicated by angles θx, θy and θz, respectively.

A bed of nails, spring-loaded test probes ("pogo pins") or another well-known in-circuit test fixture (not shown) is used to temporarily provide electrical power to the sensor 104 and to electrically connect the image sensor 104 to a processor 108 that analyzes the images from the image sensor 104 and controls the robot 100. Through the test fixture, the processor 108 receives image data from the image sensor 104 and evaluates image focus quality or another image attribute or set of attributes of the image. In some cases, separate, but interconnected, processors (not shown) control the robot 100 and receive and evaluate the image data. Such interconnected processors are referred to herein simply as a processor.

Once the processor 108 determines a desired position and orientation of the lens 102, the processor 108 commands the robot 100 to so position and orient the lens 102, and the lens 102 is then fixed to the image sensor 104 or a substrate 110, such as by an adhesive 112.

Figure 2:
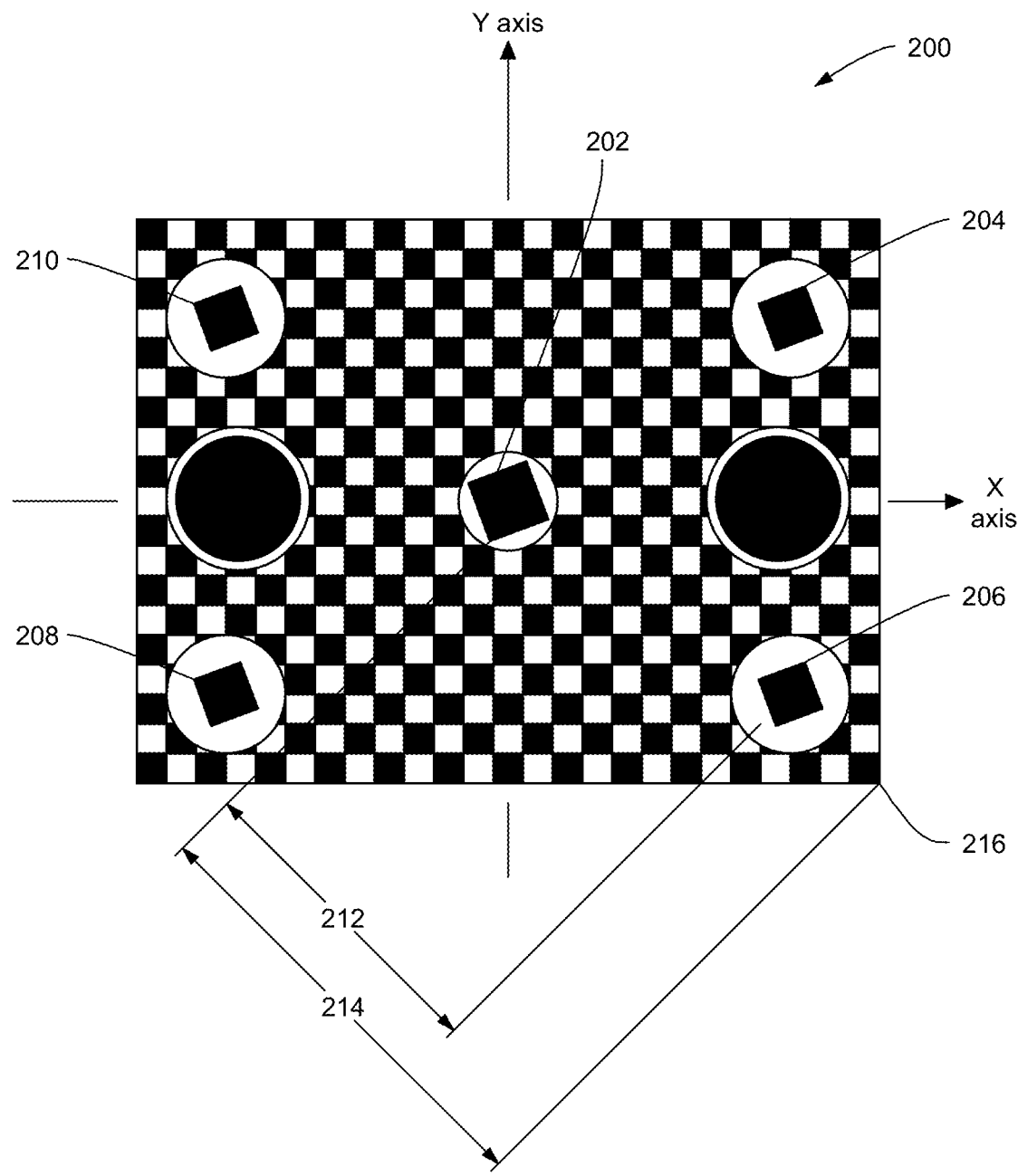
FIG. 2 is an illustration of an exemplary alignment target of FIG. 1, according to the prior art.

FIG. 2 illustrates an exemplary alignment target 200, which may be used as the target 106 in FIG. 1. The target 200 has high-contrast features at its center 202 and corners 204, 206, 208 and 210, as seen by the sensor 104. The target 200 may be printed on paper or another suitable substrate, or the target 200 may be displayed on a suitable electronic display device, such as a color or black-and-white LCD screen.

In the exemplary target shown in FIG. 2, each high-contrast feature includes a slightly rotated black square on a white background and other high-contrast elements, such as a checkerboard pattern or line pairs. Thus, the position and orientation of the lens 102, with respect to the sensor 104, that have best image focus quality, as imaged by the sensor 104, will be where the images have highest observed image intensity gradient or contrast across the high-contrast variations distributed spatially across the target 200. In other words, as the lens 102 is scanned through its various positions and orientations, when the highest contrast or intensity gradient is detected in the image, the lens 102 is positioned to provide best focus. Other active alignment systems analyze other aspects of the image, such as modulation transfer function (MTF).

Figure 3:
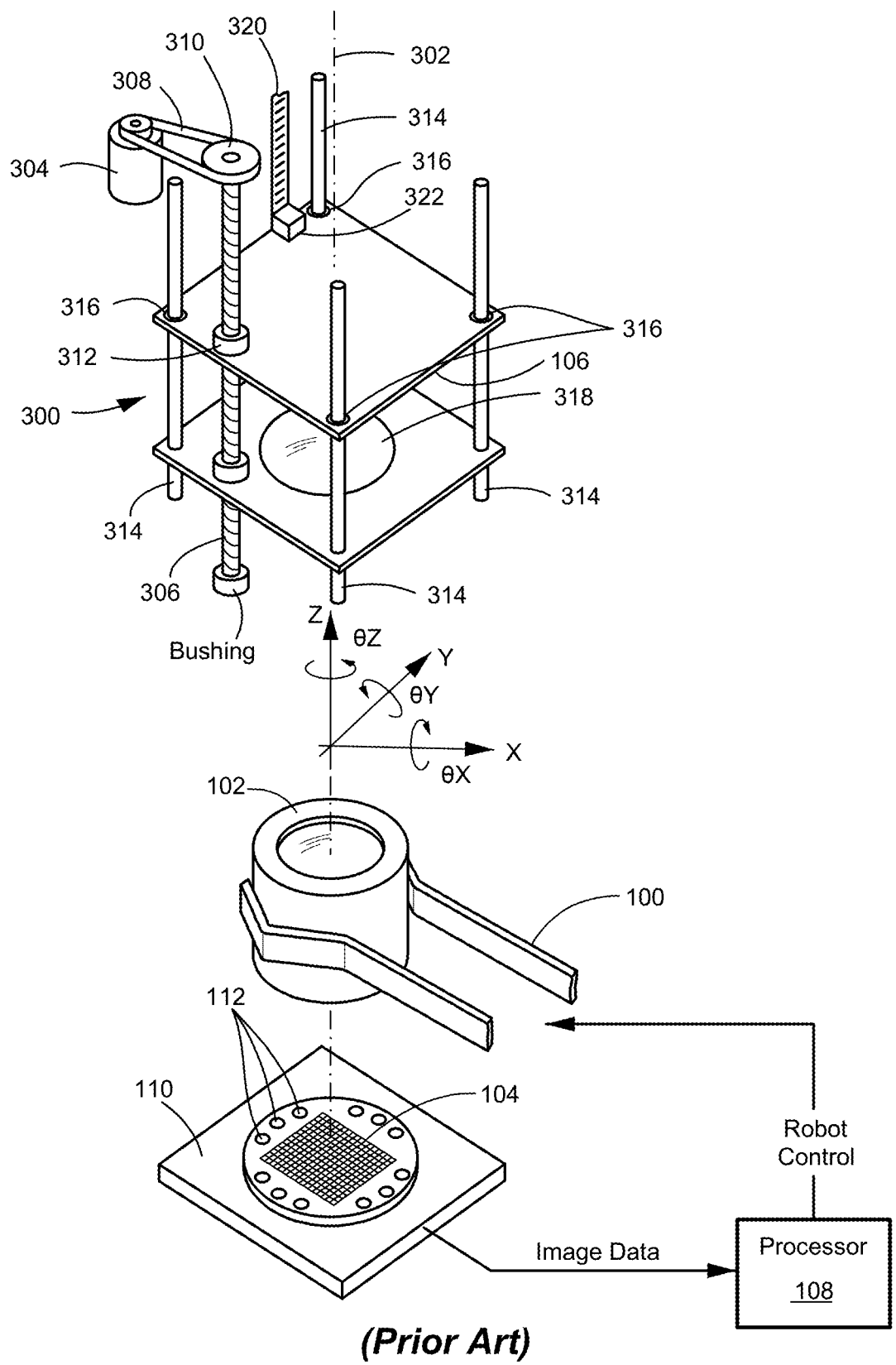
FIG. 3 is a perspective illustration of a robotic active alignment system, including a motorized target, according to the prior art.

As noted in U.S. Pat. No. 9,766,473, in some active alignment/testing systems, the target 106 (FIG. 1) is fixed, relative to the image sensor 104. However, in other active alignment/testing systems, the vertical (z-axis) location of the target 106 is adjustable. For example, as shown in FIG. 3, a motorized worm screw drive 300 may be configured to adjust the height of the target 106, relative to the image sensor 104. The motorized worm screw drive 300 adjusts the height of the target 106 along an axis parallel to, or coincident with, the optical axis 302 of the image sensor 104.

A motor 304 drives a lead screw 306, optionally via a belt 308 and pulley 310. Alternatively, the motor 304 may directly drive the lead screw 306. A threaded bushing 312 attached to the target 106 drives the target 106 up or down, depending on the direction in which the lead screw 306 is rotated by the motor 304. The target 106 rides along guides 314. The target 106 may be equipped with linear bearings 316. An intermediate lens (relay optic) 318 is disposed between the target 106 and the camera sensor 104. The intermediate lens 318 is selected to increase or decrease, as desired, the optical distance between the target 106 and the camera sensor 104.

The motorized target assembly allows for automated adjustment of the optical target distance during an optical lens alignment or test. The motor 304 may be controlled by the processor 108. A linear encoder 320 and reader 322 read vertical position of the target 106. Alternatively, a rotary encoder (not shown) may be coupled to the lead screw 304 or to the motor 305 to measure rotation thereof. Feedback from the motor 304 and/or data from the linear encoder 320 and reader 322 and/or the rotary encoder can be provided to the processor 108 to enable the processor 108 to automatically ascertain the vertical position of the target 106 and automatically calculate the effective optical distance between the target 106 and the camera sensor 104, based on the power of the intermediate lens 318.

The motorized target provides flexibility to optimize focus at different distances depending on the application. It also allows for automatic determination of best focus for a built camera by moving the target 106 to several positions throughout the focus range and recording focus quality, for example modulation transfer function, at each point. A characterization can then be automatically plotted that shows where in space the lens 102 focus in optimized, or whether the lens 102 and image sensor 104 of the built camera meet a predetermined minimum level of optical alignment.

A suitable printed target 106 can be produced relatively inexpensively. The target 106 can be replaced with a different target 106 having different features, such as to facilitate manufacturing or testing a camera having different optical characteristics, such as resolution or field of view. However, the maximum field of view angle provided by the target 106 is limited by the physical size of the target 106. Some automotive cameras have wide fields of view that cannot be filled by the apparatus shown in FIG. 3, without making the target 106 and the apparatus inordinately large.

Several techniques are available for extending the field of view provided by the target 106. For example, folding mirrors and/or prisms may be disposed outside the lens's 102 view of the target 106 to reflect an image of the target 106 toward the lens 102. In this way, multiple views of a single target 106 are essentially tiled over the field of view of the lens 102. However, such a "mirror box" arrangement limits the optical object distance than can be used.

An alternative to the target 106 and intermediate lens 318 combination described above involves aiming a plurality of collimators at the lens 102, with each collimator projecting a respective image of a respective reticle toward the lens 102. Collimators are flexible, in that they can be positioned arbitrarily and can be adjusted to any desired object distance. However, collimators are expensive and are limited in how closely they can be "packed." Thus, it may not be cost effective or possible to project images from all spatial locations of interest.

Combinations of an Intermediate Lens and a Plurality of Peripheral Collimators

As noted, embodiments of the present invention provide robotic systems for automatically aligning and/or testing alignment of a lens to a digital camera. Each such embodiment includes a combination of a target 106, an intermediate lens 318 and a plurality of collimators 400, as illustrated in FIG. 4. When manufacturing or testing a camera with a relatively narrow field of view, such as less than about 30°, the entire field of view of the camera can be filled with a view of the target 106 through the intermediate lens 318, and the collimators 400 need not be used.

However, when manufacturing or testing a camera having a relatively large field of view, both the intermediate lens 318 and the plurality of collimators 400 are used to fill the camera's field of view. The intermediate lens 318 fills a central portion of the camera's field of view with the target 106, and the collimators 400 project images of reticles onto the camera's image sensor, outside the central portion of the field of view of the camera.

The disclosed combination thus provides a cost-effective, yet optically accurate, system. Because lenses typically lose optical accuracy off-axis, using the intermediate lens 318 for relatively narrow field of view cameras, and only for the central portion of wide field of view cameras, and thus staying within the "sweet spot" of the intermediate lens 318, is cost effective. Thus, the system can easily handle a wide range of camera fields of view, without the expense of a large number of collimators.

Figure 5:
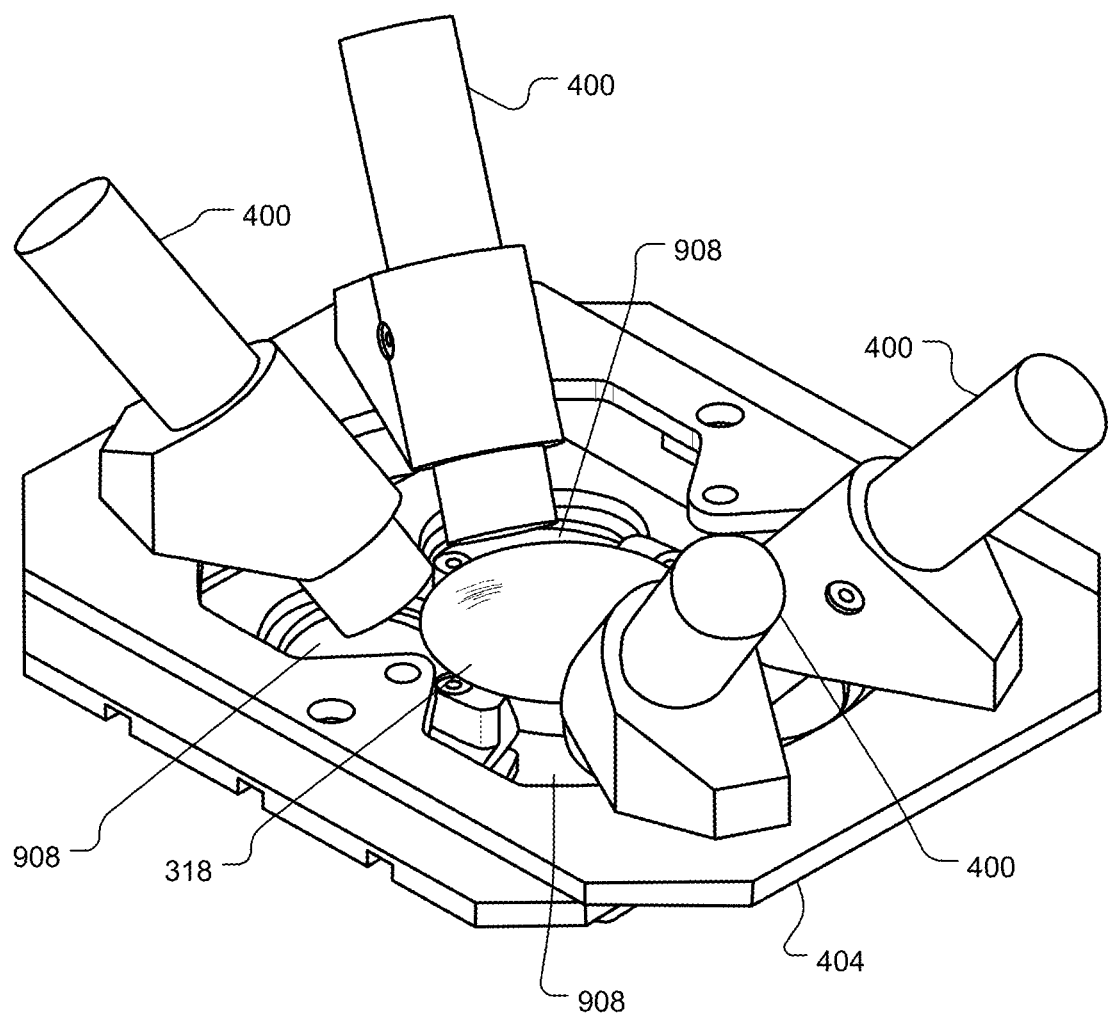
FIG. 5 is a perspective illustration of an optical stage of the system of FIG. 4, including an intermediate lens and a plurality of collimators disposed peripheral to the intermediate lens, according to an embodiment of the present invention.
Figure 6:
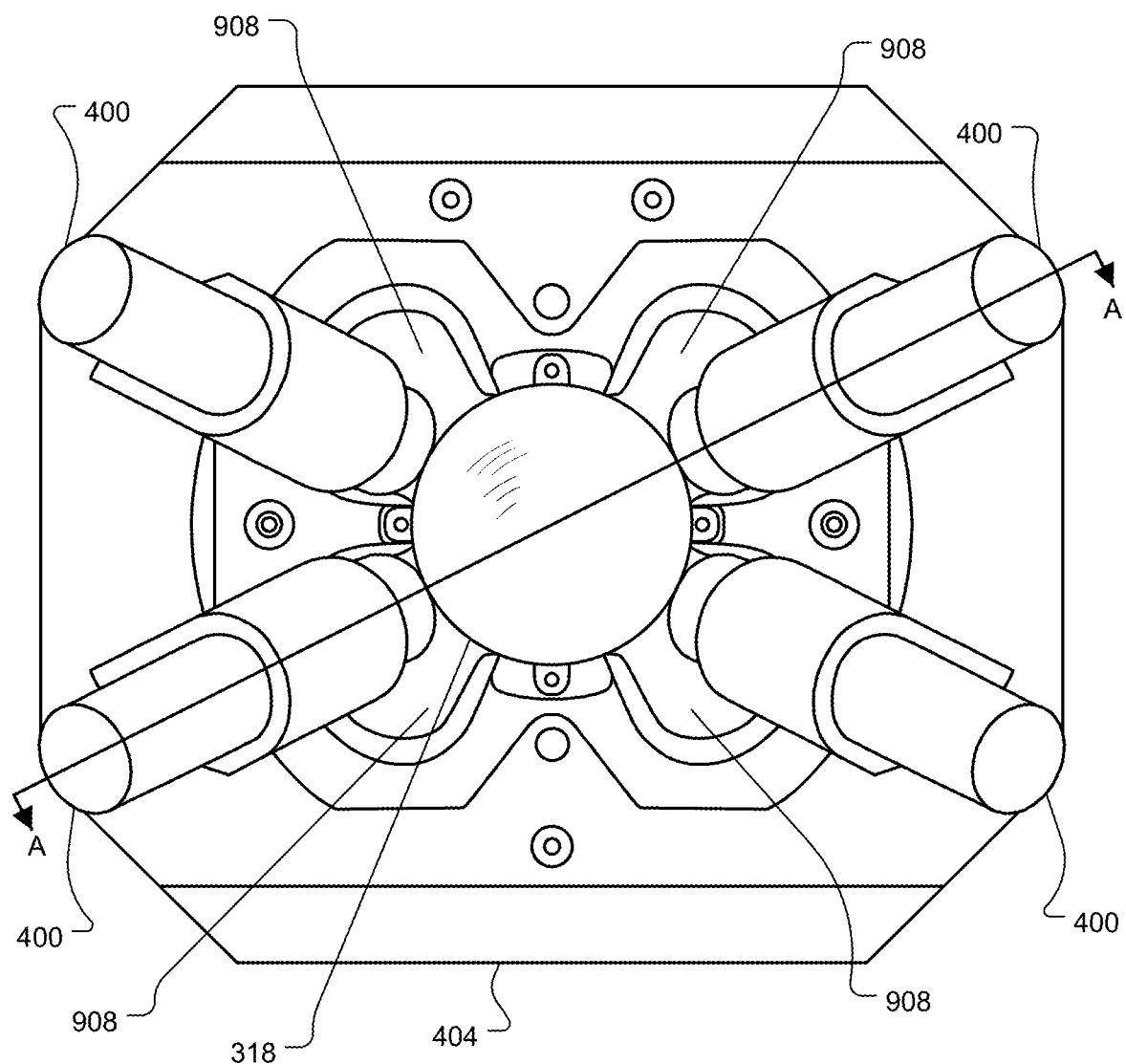
FIG. 6 is a top view of the optical stage of FIG. 5, according to an embodiment of the present invention.

FIG. 4 is a perspective illustration of a robotic active alignment/test system 402, according to an embodiment of the present invention. The system 402 includes several elements described above, with respect to FIGS. 1-3. As shown in FIG. 4, the system 402 includes an optical stage 404. The optical stage 404 includes an intermediate lens 318, as discussed with respect to FIG. 3. The optical stage 404 also provides a platform for a plurality of collimators, represented by collimators 400. The optical stage 404 is best seen in FIGS. 5 and 6. FIG. 5 is a perspective view of the optical stage 404, and FIG. 6 is a top view, as seen from the target 106, of the optical stage 404. Although four collimators 400 are shown in the system 402, other numbers, for example two, three, five, six, seven, eight, nine or more, of collimators 400 may be used, depending on field of view and/or optical target resolution desired, cost constraints, size of the optical stage 404, size of the intermediate lens 318 and user requirements. In some embodiments, the optical stage 404 provides a modular base, on which any number, up to a predetermined maximum number, of the collimators 400 may be mounted. In such embodiments, the number and dispositions of the collimators 400 may be changed by an operator, such as to accommodate different workpieces. The optical stage 404 may be mounted on the system 402 via a kinematic mount to facilitate easy changeover from one optical stage 404, having one number and/or disposition of collimators 400, to another optical stage 404 having a different number and/or disposition of collimators 400. Such a kinematic mount also facilitates good repeatability in position and orientation of the optical stage 404. An exemplary kinematic mount is shown in an insert in FIG. 4.

The processor 406 in the system 402 is, however, different from the processor 108 of FIGS. 1 and 3. For example, in addition to being configured to perform the functions described with respect to FIGS. 1-3, the processor 406 controls operations of the collimators 400, as described herein.

As used herein, a camera or other optical device assembled and/or tested by the system 402 is referred to as a "workpiece." Other examples of workpieces include optical communication devices that include optical fibers optically coupled, and therefore aligned, to lasers or light sensors. The workpiece is not part of the system 402. As noted, workpieces having various size fields of view can be assembled and/or tested by the system 402. Similarly, a single workpiece having a variable field of view, such as a camera with a zoom lens, can be assembled and/or tested by the system 402.

Figure 7:
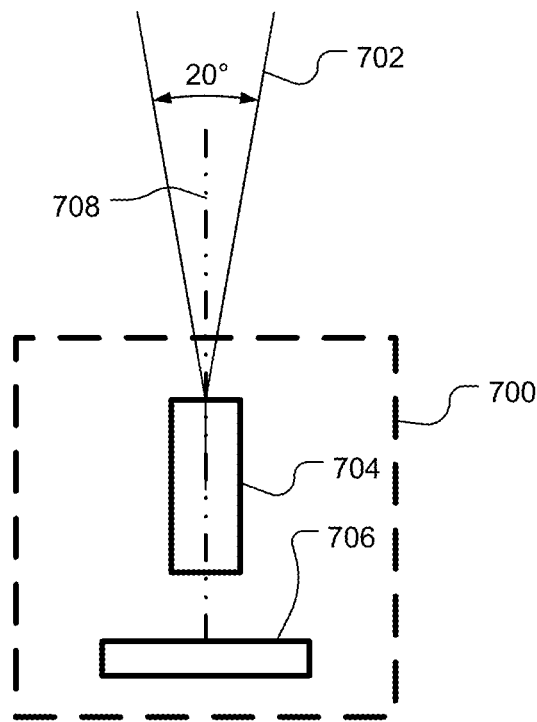
FIG. 7 is an illustration of an exemplary hypothetical unit under test (workpiece) having a relatively narrow field of view that may be manufactured or tested using the system of FIG. 4, according to an embodiment of the present invention.

FIG. 7 illustrates an exemplary hypothetical workpiece 700 that has a relatively narrow field of view 702 of about 20°, although workpieces with other relatively narrow fields of view can be assembled and/or tested by the system 402. The exemplary workpiece 700 is a camera that includes a lens 704, which corresponds to the lens 102 in FIGS. 1, 3 and 4, and an image sensor 706, which corresponds to the image sensor 104 in FIGS. 1, 3 and 4. The workpiece 700 has an optical axis 708.

Figure 8:
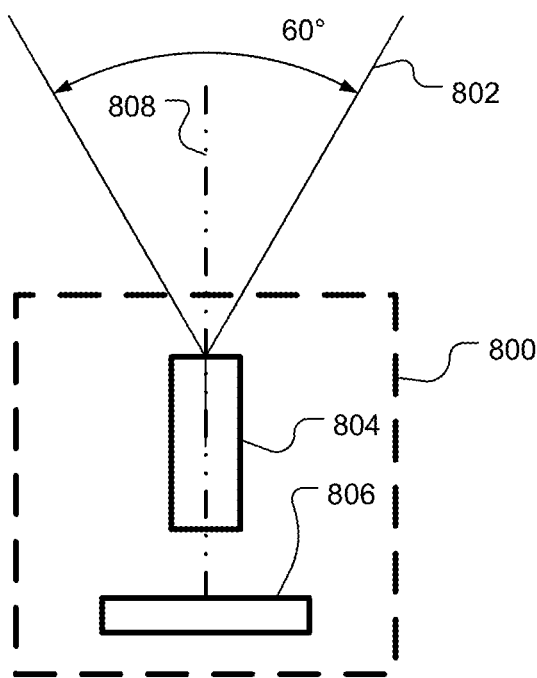
FIG. 8 is an illustration of another exemplary hypothetical unit under test (workpiece) having a relatively wide field of view that may be manufactured or tested using the system of FIG. 4, according to an embodiment of the present invention.

Similarly, FIG. 8 illustrates an exemplary hypothetical workpiece 800 that has a relatively wide, compared to the workpiece 700, field of view 802 of about 60°, although workpieces with other relatively wide fields of view can be assembled and/or tested by the system 402. In the automotive camera art, fields of view narrower than about 52° are often referred to as "narrow," and fields of view wider than about 100° are often referred to as "wide." However, as used herein, the terms "narrow field of view" and "wide field of view" are relative terms and meaningful only when comparing fields of view of two workpieces. Thus, in some instances, a workpiece having a 60° field of view may be referred to as having a narrow field of view, such as when compared to a workpiece having a 180° field of view. The exemplary workpiece 800 is a camera that includes a lens 804, which corresponds to the lens 102 in FIGS. 1, 3 and 4, and an image sensor 806, which corresponds to the image sensor 104 in FIGS. 1, 3 and 4. The workpiece 800 has an optical axis 808.

Figure 9:
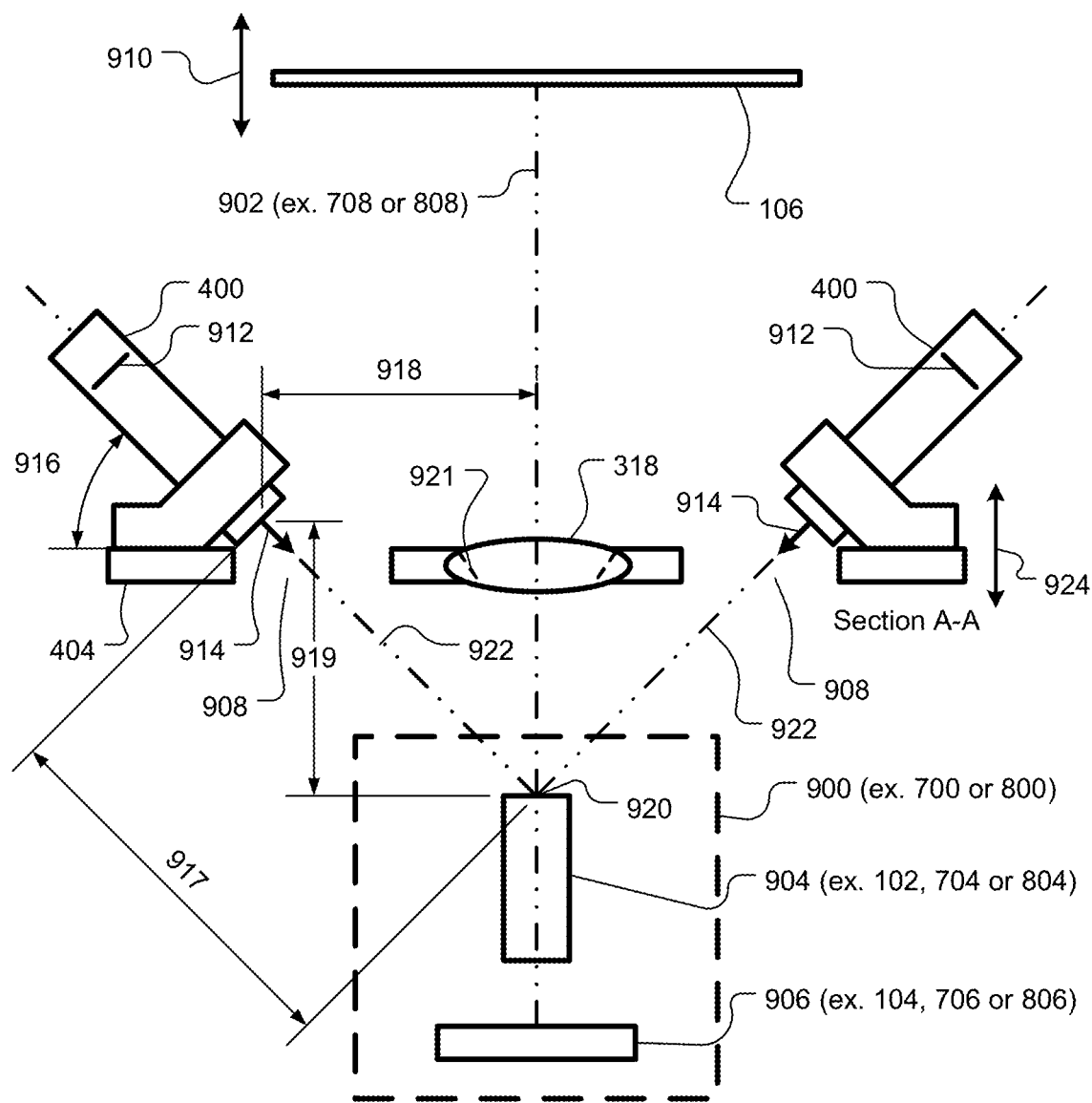
FIG. 9 is a side view, partial cross-section, of key components of the system of FIGS. 4-6, according to an embodiment of the present invention.

FIG. 9 is a side view illustration of key components of the system 402, as well as an exemplary hypothetical workpiece 900, for example, either the workpiece 700 of FIG. 7 or the workpiece 800 of FIG. 8, in position for assembly or test.

Each workpiece 900 has a respective optical axis 902, for example optical axis 708 (FIG. 7) or optical axis 808 (FIG. 8). In the example in FIG. 9, the workpiece 900 is a camera that includes a lens 904, which corresponds to the lens 102, 704 or 804, and an image sensor 906, which corresponds to the image sensor 104, 706 or 808 although, as discussed, other types of workpieces 900 may be assembled and/or tested by the system 402.

The optical stage 404 is shown in cross-section, as sectioned by line A-A in FIG. 6. In FIG. 4, two of the collimators 400 are visible, attached to the optical stage 404. The optical stage 404 defines a respective aperture 908 for each collimator 400. The apertures 908 are best seen in FIGS. 5 and 6.

Figure 10:
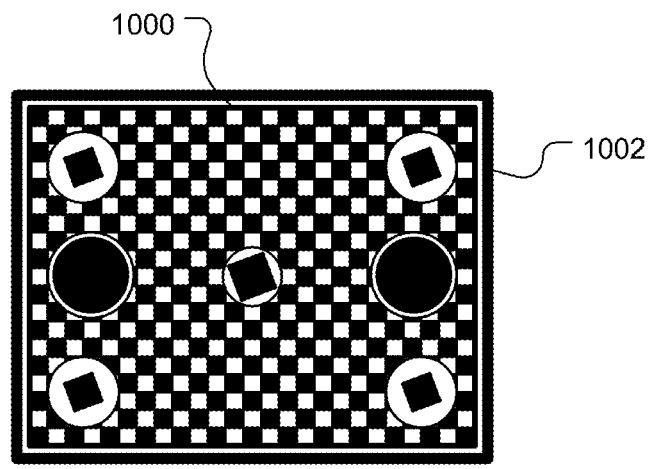
FIG. 10 is an illustration of an exemplary hypothetical image of a target, as imaged by the exemplary hypothetical unit under test (workpiece) of FIG. 7, according to an embodiment of the present invention.

As shown in FIG. 10, if the workpiece 900 has a relatively narrow field of view, for example as shown in FIG. 7, the target 106 can be positioned, as indicated by double-headed arrow 910 (FIG. 9), relative to the intermediate lens 318 and the workpiece 900, such that an image 1000 of the target 106, via only the intermediate lens 318 and the lens 904 of the workpiece 900, fills or nearly fills the field of view 1002 of the workpiece 900. As used in this context, "only" means without use of any of the collimators 400.

As shown in FIG. 10, the image 1000 of the target 106 essentially fills the field of view 1002 of the workpiece 900. That is, the image 1000 essentially covers the image sensor 906 of the workpiece 900, or the image 1000 covers as much of the image sensor 906 as is needed to perform an adequate active alignment or test. In this context, the system 402 operates in a manner similar to the system of FIG. 3, in that all light that forms the image 1000 passes through the intermediate lens 318, and only light from the target 106, i.e., not any light from the collimators 400, is used to form the image 1000. The collimators 400 play no role in creating the image 1000.

Figure 11:
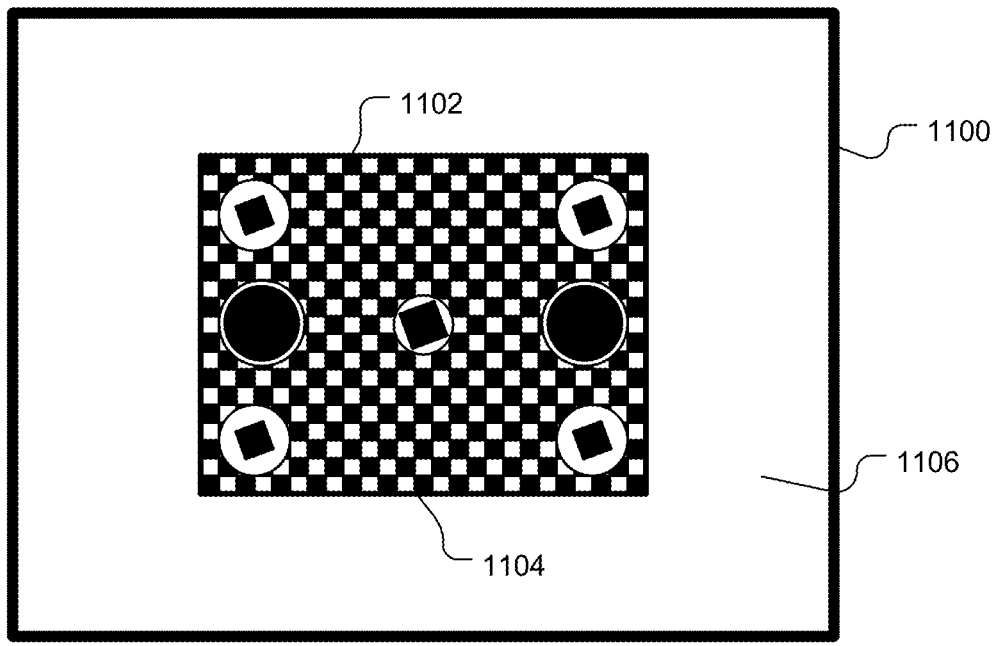
FIG. 11 is an illustration of an exemplary hypothetical image of a target, as imaged by the exemplary hypothetical unit under test (workpiece) of FIG. 8, using only the intermediate lens of the system, according to an embodiment of the present invention.

If, however, as shown in FIG. 11, the workpiece 900 (FIG. 9) has a relatively wide field of view 1100, for example as shown in FIG. 8, it may not be possible to position the target 106 so as to sufficiently fill the field of view 1100 of the workpiece 900 with an image of the target 106, via only the intermediate lens 318 and the lens 904 of the workpiece 900, i.e., without the collimators 400.

FIG. 11 shows an exemplary hypothetical field of view 1100 of a relatively wide field of view workpiece 900. As shown in FIG. 11, only a central portion 1102 of the field of view 1100 is filled with an image 1104 of the target 106, via only the intermediate lens 318 and the lens 904 of the workpiece 900. A significant portion 1106 of the field of view 1100 of the wide field of view workpiece 900 is devoid of an image of the target 106.

However, the collimators 400 fill in at least some of the portion 1106 of the field of view 1100 that does not receive the image 1104 of the target 106 via the intermediate lens 318 and the lens 904 of the workpiece 900. Collimators are well known to those of skill in the art. A collimator is an optical instrument that includes a well-corrected objective lens with an illuminated reticle at its focal plane. Exemplary reticle shapes include: pre-distorted squares, cross-shapes and crosslines. Exemplary reticles 912 are shown in FIG. 9. A collimator typically also includes an objective tube, a source of illumination and a condenser. The source of illumination can produce humanly-visible light and/or other wavelengths, such as infrared (IR), as needed to test or align a respective workpiece 900. An emerging beam, represented by respective beams 914 in FIG. 9, is essentially parallel, hence a "collimated beam," so that an image of the reticle is projected at infinity, although some collimators can be set to other focal distances. Suitable collimators 400 are readily available as commercial off-the-shelf (COTS) items.

Figure 12:
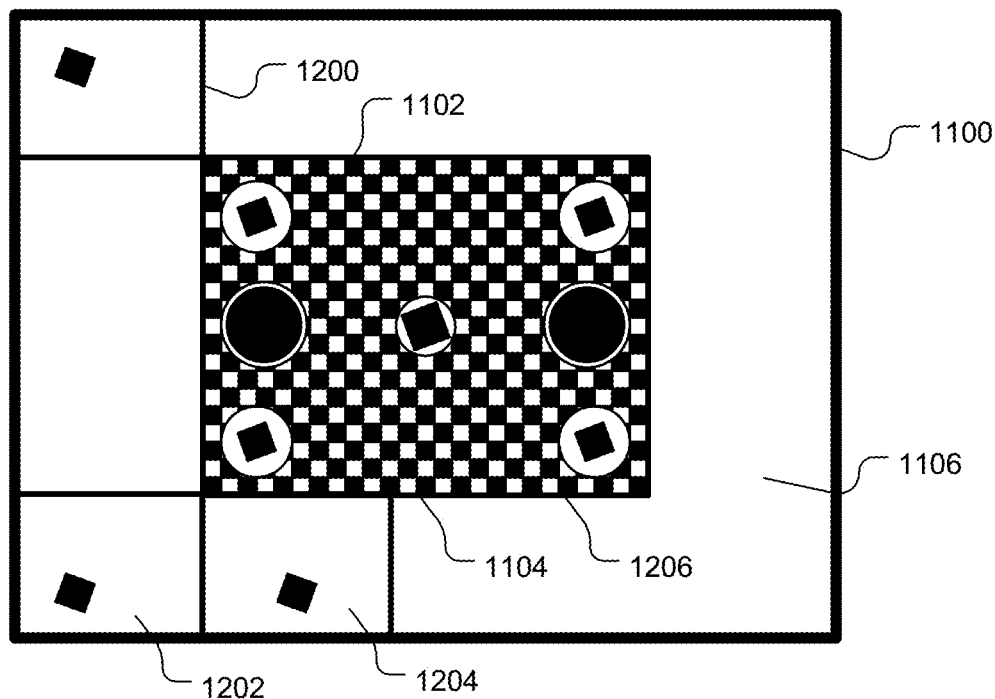
FIG. 12 is an illustration of an exemplary hypothetical image of a target, as imaged by the exemplary hypothetical unit under test (workpiece) of FIG. 8 using the intermediate lens of the system, as well as three exemplary hypothetical images of respective reticles of three of the collimators of FIGS. 4-6, according to an embodiment of the present invention.
Figure 12:
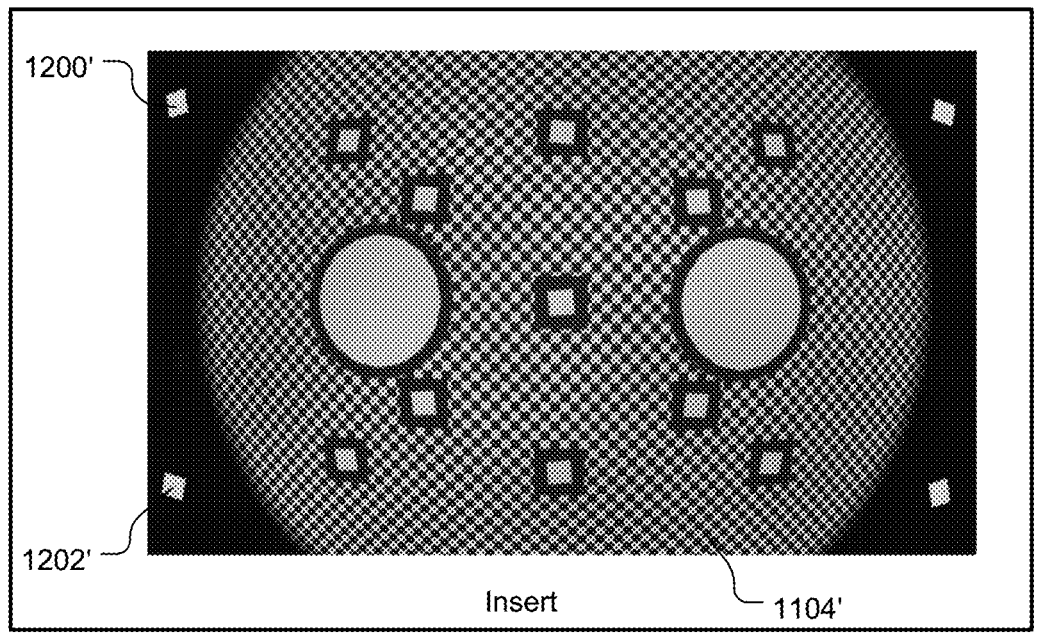

When a relatively wide field of view workpiece 900 is assembled or tested, the collimators 400, or a subset of the collimators 400, project respective images of their respective reticles 912 through the lens 904 of the workpiece 900, onto the image sensor 906. The images of the reticles 912 do not pass through the intermediate lens 318. FIG. 12 shows an exemplary hypothetical image 1200 of one reticle 912, projected by one of the collimators 400, within the field of view 1100 of the workpiece 900. Although the image 1200 of the reticle 912 is shown as a rotated high-contrast square, similar to a portion of the target 106, other suitable reticles 912 can be used. The reticles 912 of the collimators 400 need not all be identical to each other, and the reticles 912 of the collimators 400 need not project images 1200 identical to the image 1104 of the target 106.

Additional collimators 400 project additional images, exemplified by images 1202 and 1204, of their respective reticles 912 within the field of view 1100 of the workpiece 900. Collectively, the image 1104 of the target 106 and the images 1200-1204 of the respective reticles 912 can, but need not necessarily, tile and essentially fill the field of view 1100 of the workpiece 900. That is, collectively, the image 1104 of the target 106 and the images 1200-1204 of the respective reticles 912 can leave gaps within the field of view 1100, in which no image is projected.

Similarly, some or all of the image 1104 of the target 106 and/or the images 1200-1204 of the respective reticles 912 can overlap other of the images 1104 and/or 1200-1204. Collectively, the image 1104 of the target 106 and the images 1200-1204 of the respective reticles 912 should fill as much of the field of view 1100 required for building/testing, and whichever portions of the field of view 1100, as are necessary to accurately access optical alignment of the workpiece 900. However, each image 1200-1204 of a respective reticle 912 should extend outside an outer boundary 1206 of the image 1104 of the target 106 on the workpiece 900, i.e., into the portion 1106 of the field of view 1100 of the wide field of view workpiece 900 that is devoid of an image of the target 106. The phrase "extends outside an outer boundary" does not necessarily require the entirety of each image 1200-1204 to lie completely outside the outer boundary 1206. The entirety of each image 1200-1204 need not necessarily lie completely outside the outer boundary 1206. That is, some or all of the images 1200-1204 may overlap the image 1104.

An insert in FIG. 12 illustrates alternative exemplary hypothetical images 1200' and 1202' of respective reticles 912, projected by respective collimators 400, within the field of view 1100 of the workpiece 900, as well as an alternative image 1104' of an alternative target 106.

The collimators 400 (FIG. 9) may be placed at various angles 916 to the optical stage 404 and at various distances 918 from the optical axis 902 of the workpiece 900 or distances 919 from the front surface of the collimators 400 to the entrance pupil 920 of the work piece 900, depending on a desired aspect ratio, i.e., height to width ratio of the resulting collection of images 1200-1204. In some embodiments, the angles 916 and/or the distances 918 and/or 919 are fixed. In other embodiments, angles 916 and/or distance 917 are adjustable. Optionally, depending on the angle 916 or distance 917, an edge of the intermediate lens 318 may be ground to a chamfer 921 to facilitate disposing the collimators 400 close to the intermediate lens 318.

The system 402 (FIG. 4) can be used for automatically aligning, and/or testing alignment of, a workpiece 900 (FIG.

9) that has an optical axis 902, for example, optical axis 708 or 808. The system 402 may be used to assemble and/or test different types of workpieces 900 at different times. For example, during a first time period, the workpiece 900 may be a camera-workpiece 700 (FIG. 7) with a relative narrow field of view 702. For example, the relatively narrow field of view 702 may be about 30° or less than about 30°. The relatively narrow field of view workpiece 700 includes a first lens 704 and a first digital camera 706 collectively having a first field of view 702.

During a second time period, the workpiece 900 may be a camera-workpiece 800 (FIG. 8) with a relatively wide field of view 802. For example, the relatively wide field of view 802 may be greater than about 30°. The relatively wide field of view workpiece 800 includes a second lens 804 and a second digital camera 806 collectively having a second field of view 802 that is wider than the first field of view 702.

The system 402 includes a processor 406 (FIG. 4). The target 106 is configured to translate along the respective workpiece optical axis 902 (ex., optical axis 708 or 808), in response to a first command from the processor 406. The target is configured to translate to a position specified by the processor 406. The processor 406 is configured to thereby selectively adjust optical spacing between the target 106 and the workpiece 900.

The intermediate lens 318 is disposed optically between the target 106 and the workpiece 900. The intermediate lens 318 is configured to form a first image 1000 during the first time period. The first image 1000, of the target 106, is formed on the first digital camera (image sensor 706), via a sequence of the intermediate lens 318 and the first lens 702. The first image 1000 fills a first fraction of the first digital camera 706. For example, as shown in FIG. 10, the first image 1000 fills essentially 100% of the field of view 1002 of the image sensor 706. However, in some cases, the first image 1000 may fill less of the field of view 1002 of the image sensor 706, such as at least about 95%, at least about 90%, at least about 85%, at least about 80%, at least about 70%, at least about 60, at least about 50%, at least about 40% or at least about 30%.

The intermediate lens 318 is configured to form a second image 1104 of the target 106 during the second time period. The second image 1104 is formed on a central portion 1102 of the second digital camera (image sensor 806), via a sequence of the intermediate lens 318 and the second lens 802. The second image 1104 fills a second fraction of the second digital camera 806. The second fraction is smaller than the first fraction. For example, as shown in FIGS. 11 and 12, the second image 1104 fills about 30% of the field of view 1100 of the image sensor 806. However, in some cases, the second image 1104 may fill a different second fraction of the field of view 1100 of the image sensor 806, such as at most about 10%, at most about 20%, at most about 30%, at most about 40%, at most about 50%, at most about 60%, at most about 70% or at most about 80%.

The plurality of collimators 400 is disposed peripheral to the intermediate lens 318. The plurality of collimators 400 is proximate an outer edge of the intermediate lens 318, but each collimator 400 may be spaced apart from the outer edge of the intermediate lens 318. The plurality of collimators 400 may, but need not necessarily, be immobile, relative to the intermediate lens 318, along the workpiece optical axis 902.

Each collimator 400 has a respective reticle 912. Each collimator 400 is configured to project 914 a respective image 1200, 1202 or 1204 of the reticle 912, during the second time period. Each collimator 400 is configured to project 914 the respective image 1200-1204 of the reticle 912 through the second lens 804, on the second digital camera (image sensor 806), without the image 1200-1204 of the reticle 912 passing through the intermediate lens 318. Each collimator 400 is configured to project 914 the respective image 1200-1204 of the reticle 912, such that the image 1200-1204 of the reticle 912 extends outside an outer boundary 1206 of the second image 1104 of the target 106 on the second digital camera 806.

The robot 100 is configured to grasp and, in response to a second command 408 (FIG. 4) from the processor 406, scan at least a portion of the workpiece 900 along a trajectory. The processor 406 is configured to analyze signals 410 (FIG. 4) acquired from the workpiece 900, while the workpiece 900 is scanned along the trajectory, and thereby quantitatively assess a degree of optical alignment of the workpiece 900, for example optical alignment of the lens 904 to the image sensor 906.

Figure 13:
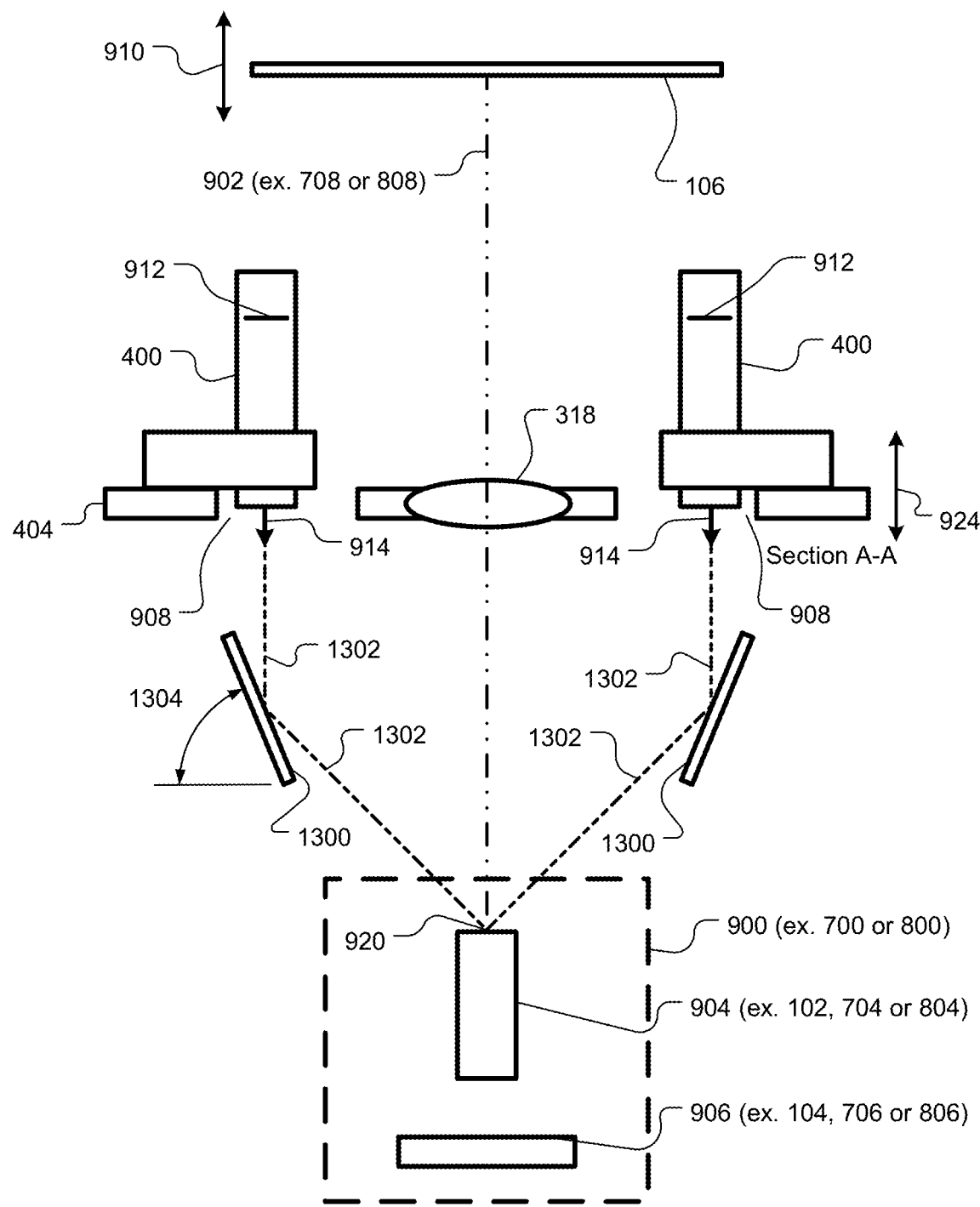
FIG. 13 is a side view, partial cross-section, of key components of the system of FIGS. 4-6, according to another embodiment of the present invention.

In the embodiment shown in FIGS. 4-6 and 9, each collimator 400 is oriented toward an entrance pupil center 920 of the workpiece 900, as indicated by lines 922. However, in some embodiments, as shown in FIG. 13, each collimator 400 is oriented parallel to the workpiece optical axis 902. In such embodiments, the system 402 may include, for each collimator, a respective folding optical element 1300, such as a mirror or prism, configured to redirect, as indicated by lines 1302, the respective image of the reticle 912 of the collimator 400 toward the entrance pupil center 920 of the workpiece 900. In some embodiments, angles 1304 of the folding optical elements 1300 are fixed. In other embodiments, the angles 1304 are adjustable, such as by an operator or by the processor 406. Although the collimators 400 are shown with optical axes parallel to the workpiece optical axis 708 or 808, in other embodiments the collimator 400 optical axes may be not parallel to the workpiece optical axis 708 or 808. In some embodiments, the angles of the collimators 400 may be adjustable, relative to the optical stage 404, so the angles of the optical axes of the collimators 400 are adjustable.

In some cases, it may be desirable for the collimators 400, or as subset of the collimators 400, to have focal distances other than infinity, or to have variable focal distances. Thus, optionally, the focal length of some or all of the collimators 400 is adjustable, such as by a motor (not shown) in the collimator 400, and each such collimator 400 is configured to adjust its focal length in response to a third command from the processor 406, and the processor is configured to calculate or estimate a desired focal length and send the third command.

Optionally, the plurality of collimators 400, or a subset of the collimators 400, is configured to translate, as indicated by a two-headed arrow 924 (FIG. 9) along the respective workpiece optical axis 902, in response to a fourth command from the processor 406, to a position specified by the processor 406. In such cases, the processor 406 is configured to thereby selectively adjust optical spacing between the plurality of collimators 400 and the workpiece 900, in coordination with the optical spacing between the target 106 and the workpiece 900, and to send the fourth command.

A motor, lead screw, threaded bushing, guides and linear bearings may be used to translate the collimators 400, in a manner similar to that used to translate the target 106, as discussed herein with respect to FIG. 3. The translatable collimators 400 translate along with the intermediate lens 318, or the translatable collimators 400 may be mounted on a separate optical stage (not shown) and may translate independently of the intermediate lens 318. The processor 406 may coordinate translation of the translatable collimators 400 with translation of the target 106.

Figure 16:
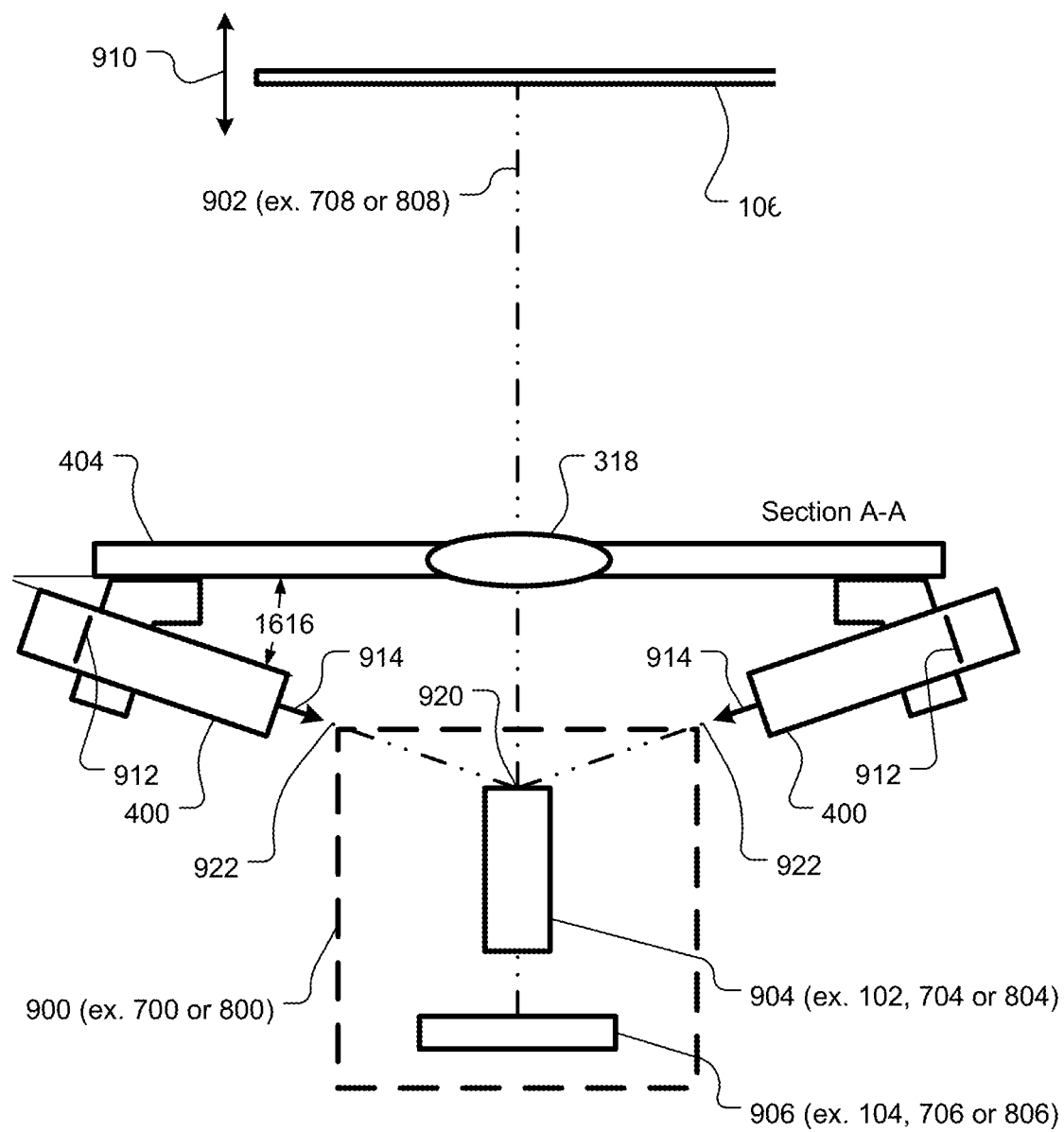
FIG. 16 is a side view, partial cross-section, of key components of the system of FIGS. 4-6, similar to the illustration of FIG. 9, however according to another embodiment of the present invention, in which the collimators are attached to a bottom of the optical stage.

FIG. 16 is a side view illustration of key components of the system 402, as well as an exemplary workpiece 900, similar to FIG. 9, but according to another embodiment, in which the collimators 400 are attached to the bottom of the optical stage 404. That is, the collimators 400 are attached to the side of the optical stage 404 that faces the workpiece 900. As can be seen by comparing FIGS. 9 and 16, disposing the collimators 400 on the bottom of the optical stage 404 facilitates generating a wider field of view image. That is, the angle 1616 can be shallower than the angle 916 (FIG. 9). The optical stage 404 need not define apertures 908 (FIG. 9), when the collimators 400 are mounted below the optical stage 404.

Figure 14:
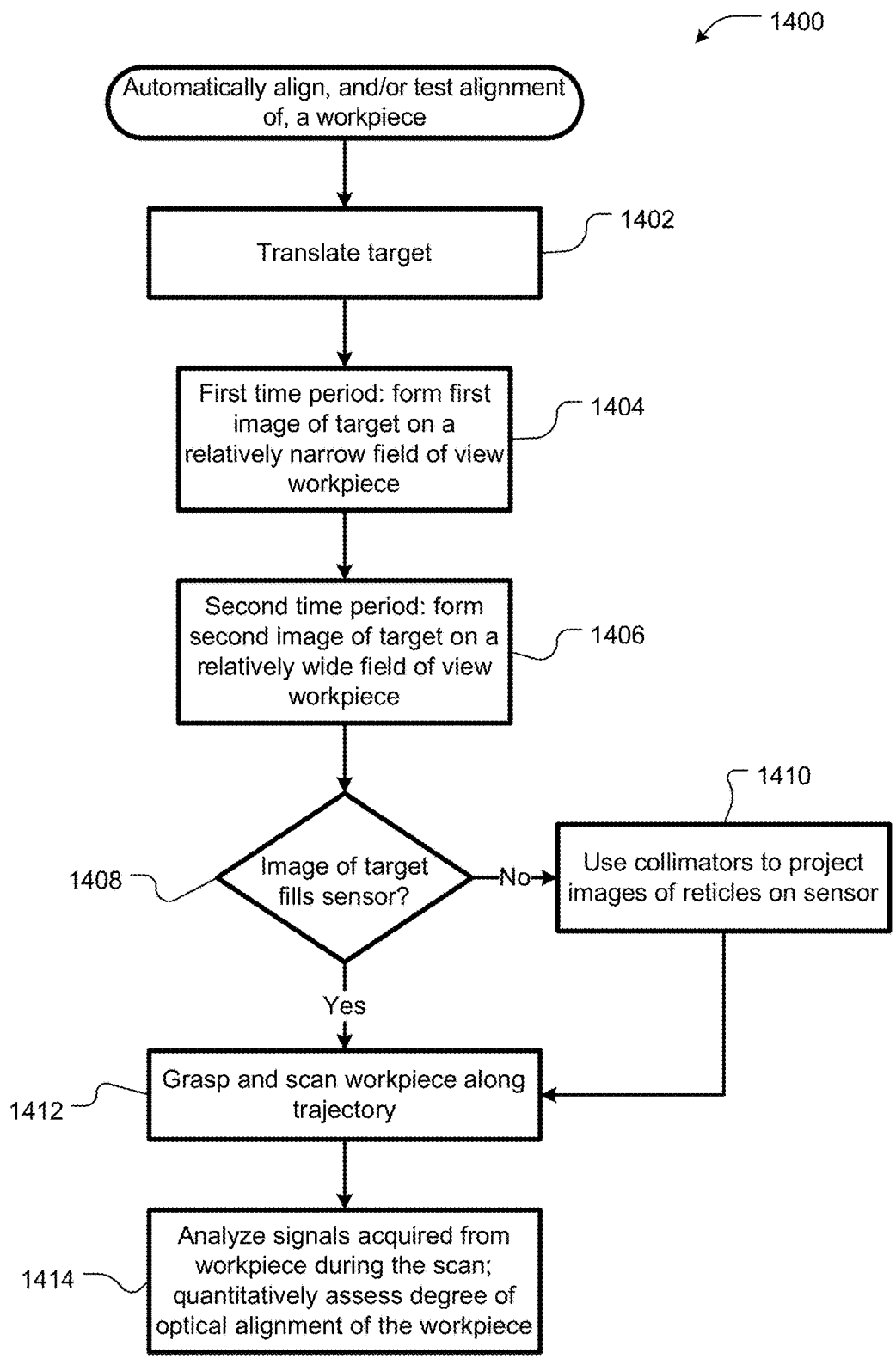
FIG. 14 is a flowchart schematically illustrating operations performed by a processor of FIG. 4 in performing a computer-implemented method of automatically aligning, and/or testing alignment of, a workpiece, according to an embodiment of the present invention.

FIG. 14 is a flowchart schematically illustrating operations performed by the processor 406 (FIG. 4) in performing a computer-implemented method 1400 of automatically aligning, and/or testing alignment of, a workpiece 900 having a workpiece optical axis 902, wherein during a first time period the workpiece 900 includes a first lens 704 and a first digital camera 706 collectively having a first field of view 702, and during a second time period the workpiece 900 includes a second lens 804 and a second digital camera 806 collectively having a second field of view 802 wider than the first field of view 702.

At 1402, the processor 406 performs a process configured to translate the target 106 along the respective workpiece optical axis 708 or 808, in response to a first command from the processor 406, to a position specified by the processor 406. The processor 406 is configured to thereby selectively adjust optical spacing between the target 106 and the workpiece 900.

At 1404, during the first time period, the processor 406 causes formation of a first image 1000 of the target 106 on the first digital camera 706, via a sequence of the intermediate lens 318, disposed optically between the target 106 and the workpiece 900, and the first lens 702. The first image 1000 fills a first fraction of the first digital camera 706.

At 1406, during the second time period, the processor 406 causes formation of a second image 1104 of the target 106 on a central portion 1102 of the second digital camera 806, via a sequence of the intermediate lens 318 and the second lens 802. The second image 1104 fills a second fraction of the second digital camera 806 smaller than the first fraction.

The processor 406 executes a process configured to control the plurality of collimators 400 disposed peripheral to the intermediate lens 318. Each collimator 400 has a respective reticle 912 and is configured to project 914, during the second time period, a respective image 1200, 1202 or 1204 of the reticle 912, through the second lens 804, on the second digital camera 806, without the image 1200-1204 of the reticle 912 passing through the intermediate lens 318, such that the image 1200-1204 of the reticle 912 extends outside an outer boundary 1206 of the second image 1104 of the target 106 on the second digital camera 806.

At 1408, if the second image 1104 sufficiently fills the second digital camera 806 to perform an active alignment and/or test, as the case may be, control passes to 1412. However, if the second image 1104 insufficiently fills the second digital camera 806 to perform an active alignment and/or test, as the case may be, control passes to 1410. At 1410, the processor 406 causes the collimators 400 to project images of their respective reticles 912 on the second digital camera 806.

At 1412, a process controls the robot 100 to grasp and, in response to a second command 408 from the processor 406, scan at least a portion of the workpiece 900 along a trajectory. At 1414, a process analyzes signals 410 acquired from the workpiece 900, while the workpiece 900 is scanned along the trajectory, and thereby quantitatively assesses a degree of optical alignment of the workpiece 900.

Figure 15:
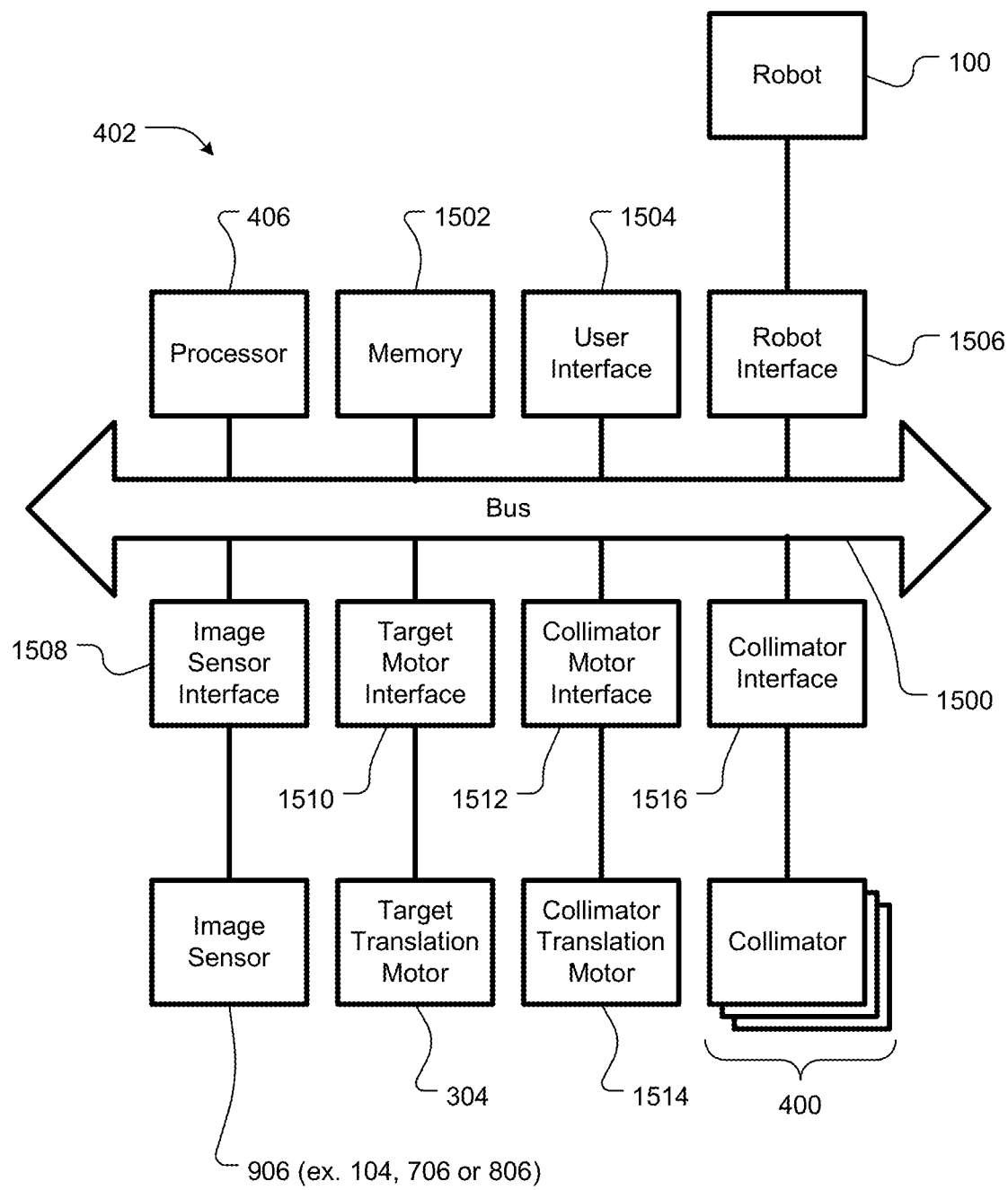
FIG. 15 is a schematic block diagram of the system of FIGS. 4-6, 9-13, according to embodiments of the present invention.

FIG. 15 is a schematic block diagram of the system 402. The processor 406 is interconnected to other components via a computer bus 1500. The system 402 includes a suitable memory 1502 and a suitable human user interface (UI) 1504. For example, the user interface 1504 may be used to display information about test results, after a workpiece 900 has been tested.

The system 402 includes a suitable robot interface 1506 to interconnect with, and send commands 408 to, the robot 100. A suitable image sensor interface 1508 is configured to interconnect with, and receive image data 410 from, the image sensor 906, 104, 706 or 806. A target motor interface 1510 is configured to interface with the target translation motor 304. A collimator motor interface 1512 is configured to interface with a suitable collimator motor 1514, in embodiments in which the collimators 400 are translatable.

A collimator interface 1516 is configured to interface with the collimators 400, including generating suitable commands to turn the collimators 400, or selected ones of the collimators 400, on and off as needed, such as during the first and second time periods. In addition, in embodiments in which the collimators 400 have adjustable focal distances, the collimator interface is configured to send signals to the collimators 400 to command the collimators 400 to adjust their respective focal distances.

As used herein, the term "lens" means an object with one or more conventional optical elements. Although the descriptions above are generally presented in the context of aligning a lens to an image sensor, the methods and apparatus described herein are equally applicable to aligning other optical elements, such as optical fibers, to other passive optical elements, such as other optical fibers, or to other optical sensors, such as photodiodes, or to optical sources, such as light emitting diodes (LEDs) and lasers. Collectively, all such lenses, image sensors, optical fibers, photodiodes, LEDs, lasers and the like are referred to herein as "optical elements." Although alignment of one optical element, such as a lens, to another optical element, such as an image sensor, has been described, the methods and apparatus described herein may be used as described, with appropriate modifications, to align more than one optical element, such as several optical fibers, with a single optical element, such as an optical sensor or an optical source. Furthermore, the aligned optical elements may, but need not, all be mounted on a common substrate, such as a printed circuit board, integrated circuit board or integrated circuit substrate.

As used herein and in the claims, a "processor" may be: a single processor; a single core of a multi-core processor; a multi-processor, such as a multi-core processor or multiple processors interconnected with each other on a single or multiple integrated circuit substrate or on a single or multiple circuit boards; a single computer or multiple interconnected computers. Although some claims recite performing one or more operations "by a processor," it should be understood that: each operation may be performed by a distinct processor; all the operations may be performed by a single processor; any combination of the operations may be performed by any combination of plural processors; performance of a single operation may be distributed over a plurality of the processors; and these and other combinations are within the scope of the claims.

As used herein, the term "automatic" or "automatically" means performed without human intervention, although a human may initiate the performance. For example, automatically fitting an equation to a set of data requires a processor to determine parameters of the equation, without assistance from a human.

By definition, a "scan" is a sequence of positions and/or orientations along a trajectory, where focus quality or another alignment quality metric is measured for each position and/or orientation. A scan can be stepped, i.e., with a pause in motion after each position and/or orientation. A scan can be continuous, i.e., without a pause in motion after each position and/or orientation. A scan can be a combination of stepped and continuous motion.

As used herein, the term "estimate" includes calculate. One or more calculations may be performed to arrive at an estimate. As used herein, the terms "fitting an equation" and "fitting a curve" may include estimating. Curve fitting is a well-known process of constructing a curve or a mathematical function that has a best fit to a series of data points, possibly subject to constraints. Curve fitting can involve interpolation, where an exact fit to the data is required, or smoothing, in which a "smoothing" function is constructed that approximately fits the data. Curve or equation fitting may involve polynomial equations, possibly including logarithmic or exponential functions. Estimating a degree of optical alignment of a workpiece may involve fitting individual measured values to a curve and/or choosing a curve that best fits a set of measured values.

While the invention is described through the above-described exemplary embodiments, modifications to, and variations of, the illustrated embodiments may be made without departing from the inventive concepts disclosed herein. For example, although specific parameter values, such as dimensions and angles, may be recited in relation to disclosed embodiments, within the scope of the invention, the values of all parameters may vary over wide ranges to suit different applications. Unless otherwise indicated in context, or would be understood by one of ordinary skill in the art, terms such as "about" mean within ±20%.

As used herein, including in the claims, the term "and/or," used in connection with a list of items, means one or more of the items in the list, i.e., at least one of the items in the list, but not necessarily all the items in the list. As used herein, including in the claims, the term "or," used in connection with a list of items, means one or more of the items in the list, i.e., at least one of the items in the list, but not necessarily all the items in the list. "Or" does not mean "exclusive or."

Although aspects of embodiments may be described with reference to flowcharts and/or block diagrams, functions, operations, decisions, etc. of all or a portion of each block, or a combination of blocks, may be combined, separated into separate operations or performed in other orders. All or a portion of each block, module or combination thereof may be implemented as computer program instructions (such as software), hardware (such as combinatorial logic, Application Specific Integrated Circuits (ASICs), Field-Programmable Gate Arrays (FPGAs), processor or other hardware), firmware or combinations thereof.

The processor 406, or portions thereof, may be implemented by one or more processors executing, or controlled by, instructions stored in a memory. Each processor may be a general purpose processor, such as a central processing unit (CPU), a graphic processing unit (GPU), digital signal processor (DSP), a special purpose processor, etc., as appropriate, or combination thereof.

The memory may be random access memory (RAM), read-only memory (ROM), flash memory or any other memory, or combination thereof, suitable for storing control software or other instructions and data. Instructions defining the functions of the present invention may be delivered to a processor in many forms, including, but not limited to, information permanently stored on tangible non-transitory non-writable storage media (e.g., read-only memory devices within a computer, such as ROM, or devices readable by a computer I/O attachment, such as CD-ROM or DVD disks), information alterably stored on tangible non-transitory writable storage media (e.g., floppy disks, removable flash memory and hard drives) or information conveyed to a computer through a communication medium, including wired or wireless computer networks. Moreover, while embodiments may be described in connection with various illustrative data structures, systems may be embodied using a variety of data structures.

Disclosed aspects, or portions thereof, may be combined in ways not listed above and/or not explicitly claimed. In addition, embodiments disclosed herein may be suitably practiced, absent any element that is not specifically disclosed herein. Accordingly, the invention should not be viewed as being limited to the disclosed embodiments.

As used herein, numerical terms, such as "first," "second" and "third," are used to distinguish respective lenses, image sensors, commands, etc. from one another and are not intended to indicate any particular order or total number of lenses, image sensors, commands, etc. in any particular embodiment. Thus, for example, a given embodiment may include only a second command and a third command.

What is claimed is:

1. A system for automatically aligning, and/or testing alignment of, a workpiece having a workpiece optical axis, wherein during a first time period the workpiece comprises a first lens and a first image sensor collectively having a first field of view, and during a second time period the workpiece comprises a second lens and a second image sensor collectively having a second field of view wider than the first field of view, the system comprising:
   a processor;
   a target configured to translate substantially along the respective workpiece optical axis, in response to a first command from the processor, to a position specified by the processor, the processor being configured to thereby selectively adjust optical spacing between the target and the workpiece;
   an intermediate lens disposed optically between the target and the workpiece and configured to form:
      during the first time period, a first image of the target on the first image sensor, via a sequence of the intermediate lens and the first lens, the first image filling a first fraction of the first image sensor; and
      during the second time period, a second image of the target on a central portion of the second image sensor, via a sequence of the intermediate lens and the second lens, the second image filling a second fraction of the second image sensor smaller than the first fraction;
   a plurality of collimators disposed peripheral to the intermediate lens, each collimator having a respective reticle and being configured to project, during the second time period, a respective image of the reticle, through the second lens, on the second image sensor, without the image of the reticle passing through the intermediate lens, such that the image of the reticle extends outside an outer boundary of the second image of the target on the second image sensor; and a robot configured to grasp and, in response to a second command from the processor, scan at least a portion of the workpiece along a trajectory;

wherein the processor is configured to analyze signals acquired from the workpiece while the workpiece is scanned along the trajectory and thereby quantitatively assess a degree of optical alignment of the workpiece.

2. A system according to claim 1, wherein focal length of each collimator of the plurality of collimators is adjustable, and each collimator is configured to adjust its focal length in response to a third command from the processor.

3. A system according to claim 1, wherein the plurality of collimators comprises at least four collimators.

4. A system according to claim 1, wherein the first field of view is less than about 60°.

5. A system according to claim 1, wherein the second field of view is greater than about 60°.

6. A system according to claim 1, wherein each collimator of the plurality of collimators is oriented toward an entrance pupil center of the workpiece, location of the entrance pupil center being based at least in part on a field of view of interest.

7. A system according to claim 1, further comprising, for each collimator, a respective folding optical element configured to redirect the respective image of the reticle toward an entrance pupil center of the workpiece, location of the entrance pupil center being based at least in part on a field of view of interest.

8. A system according to claim 7, wherein an angle of each respective folding optical element is adjustable.

9. A system according to claim 7, wherein an optical axis of each collimator of the plurality of collimators is oriented parallel to the workpiece optical axis.

10. A system according to claim 1, wherein an optical axis of each collimator of the plurality of collimators is adjustable, relative to the workpiece optical axis.

11. A system according to claim 1, wherein the plurality of collimators is attached via a kinematic mount.

12. A system according to claim 1, further comprising an optical stage configured to releasably receive the plurality of collimators, such that number and/or disposition of collimators in the plurality of collimators is adjustable.

13. A system according to claim 1, wherein each collimator of the plurality of collimators is individually removable.

14. A system according to claim 1, wherein at least some of the respective reticles of the plurality of collimators are different from other of the respective reticles of the plurality of reticles.

15. A system according to claim 1, wherein at least some collimators of the plurality of collimators are configured to project respective images of the respective reticles with different wavelengths of light from other of the collimators of the plurality of collimators.

16. A system according to claim 1, wherein wavelength of light from the plurality of collimators is adjustable.

17. A system according to claim 1, wherein color and/or intensity of the images of the respective reticles is adjustable.

18. A system according to claim 1, wherein at least some collimators of the plurality of collimators are configured to project respective images of the respective reticles at different angles, relative to the workpiece optical axis, from other of the collimators of the plurality of collimators.

19. A system according to claim 1, wherein the plurality of collimators is configured to translate along the respective workpiece optical axis, in response to a fourth command from the processor, to a position specified by the processor, the processor being configured to thereby selectively adjust optical spacing between the plurality of collimators and the workpiece in coordination with the optical spacing between the target and the workpiece.

20. A system according to claim 1, wherein the plurality of collimators is immobile, relative to the intermediate lens, along the workpiece optical axis.

21. A system according to claim 1, wherein the plurality of collimators is mobile, relative to the intermediate lens, along the workpiece optical axis.

22. A system according to claim 1, wherein the processor is configured to automatically control projection by the plurality of collimators of the respective images of the respective reticles, based at least in part on magnitude of the field of view of a current workpiece.

23. A non-transitory computer-readable medium encoded with instructions that, when executed by a processor, establish processes for performing a computer-implemented method of automatically aligning, and/or testing alignment of, a workpiece having a workpiece optical axis, wherein during a first time period the workpiece comprises a first lens and a first image sensor collectively having a first field of view, and during a second time period the workpiece comprises a second lens and a second image sensor collectively having a second field of view wider than the first field of view, the processes comprising:

a process configured to translate a target substantially along the respective workpiece optical axis, in response to a first command from the processor, to a position specified by the processor, the processor being configured to thereby selectively adjust optical spacing between the target and the workpiece and, during the first time period, form a first image of the target on the first image sensor, via a sequence of an intermediate lens, disposed optically between the target and the workpiece, and the first lens, the first image filling a first fraction of the first image sensor, and during the second time period, form a second image of the target on a central portion of the second image sensor, via a sequence of the intermediate lens and the second lens, the second image filling a fraction of the second image sensor smaller than the first fraction;

a process configured to control a plurality of collimators disposed peripheral to the intermediate lens, each collimator having a respective reticle and being configured to project, during the second time period, a respective image of the reticle, through the second lens, on the second image sensor, without the image of the reticle passing through the intermediate lens, such that the image of the reticle extends outside an outer boundary of the second image of the target on the second image sensor;

a process configured to control a robot configured to grasp and, in response to a second command from the processor, scan at least a portion of the workpiece along a trajectory; and a process configured to analyze signals acquired from the workpiece while the workpiece is scanned along the trajectory and thereby quantitatively assess a degree of optical alignment of the workpiece.

* * * * *